United States Patent
Dreesen

(10) Patent No.: US 12,332,610 B2
(45) Date of Patent: Jun. 17, 2025

(54) METHOD FOR UPDATING A CONTROL PROGRAM OF AN AUTOMATION SYSTEM WITH DATA MIGRATION OF A PROGRAM STATE OF THE CONTROL PROGRAM

(71) Applicant: Beckhoff Automation GmbH, Verl (DE)

(72) Inventor: Ralf Dreesen, Rietberg (DE)

(73) Assignee: Beckhoff Automation GmbH, Verl (DE)

( * ) Notice: Subject to any disclaimer, the term of this patent is extended or adjusted under 35 U.S.C. 154(b) by 641 days.

(21) Appl. No.: 17/749,205

(22) Filed: May 20, 2022

(65) Prior Publication Data

US 2022/0276616 A1    Sep. 1, 2022

Related U.S. Application Data

(63) Continuation of application No. PCT/EP2020/085799, filed on Dec. 11, 2020.

(30) Foreign Application Priority Data

Dec. 13, 2019 (DE) .................... 10 2019 134 373.9

(51) Int. Cl.
*G05B 13/02* (2006.01)

(52) U.S. Cl.
CPC ......... *G05B 13/021* (2013.01); *G05B 13/024* (2013.01)

(58) Field of Classification Search
None
See application file for complete search history.

(56) References Cited

U.S. PATENT DOCUMENTS

| | | | |
|---|---|---|---|
| 6,085,203 A | 7/2000 | Ahlers et al. | |
| 6,347,396 B1 | 2/2002 | Gard et al. | |
| 10,635,420 B2 | 4/2020 | Goetz | |
| 11,113,094 B1 * | 9/2021 | Koryakin | G06F 9/4843 |
| 11,360,758 B2 | 6/2022 | Harada et al. | |
| 2002/0120601 A1 | 8/2002 | Elmendorf et al. | |

(Continued)

FOREIGN PATENT DOCUMENTS

| | | |
|---|---|---|
| CN | 107924326 A | 4/2018 |
| DE | 19810802 A1 | 9/1999 |

(Continued)

OTHER PUBLICATIONS

Office Action dated Jan. 17, 2023 in connection with Japanese patent application No. 2022-535845, 8 pages including English translation.

(Continued)

*Primary Examiner* — Craig C Dorais
(74) *Attorney, Agent, or Firm* — Dorsey & Whitney LLP

(57) ABSTRACT

A method for updating a control program of an automation system with data migration of a program state of the control program is provided. The method comprises generating a first migration function for mapping a first data element to a second data element, interrupting a cyclic execution of a first control program, determining a value of the first data element, where the determined value of the first data element describes a program state of the first control program at the time of the interruption, and mapping the value of the first data element to the second data element by executing a migration function.

16 Claims, 8 Drawing Sheets

(56) References Cited

U.S. PATENT DOCUMENTS

| | | | |
|---|---|---|---|
| 2009/0216987 A1* | 8/2009 | Krishnan | ............... G06F 12/02 |
| | | | 711/171 |
| 2011/0224809 A1 | 9/2011 | Graf | |
| 2016/0335025 A1 | 11/2016 | Vaknin | |
| 2019/0098474 A1* | 3/2019 | Zhu | ...................... G06F 9/4856 |

FOREIGN PATENT DOCUMENTS

| | | |
|---|---|---|
| EP | 0764899 A1 | 3/1997 |
| JP | 2000137604 A | 5/2000 |
| JP | 2002507020 A | 3/2002 |
| WO | 2018159691 A1 | 9/2018 |

OTHER PUBLICATIONS

International Search Report and Written Opinion dated Mar. 12, 2021 in connection with International Patent Application No. PCT/EP2020/085799, 18 pages including English translation.

Office Action dated Jun. 21, 2022 in connection with Chinese patent application No. 202080085645.3, 12 pages Including English translation.

* cited by examiner

METHOD FOR UPDATING A CONTROL PROGRAM OF AN AUTOMATION SYSTEM WITH DATA MIGRATION OF A PROGRAM STATE OF THE CONTROL PROGRAM

CROSS REFERENCE TO RELATED APPLICATIONS

This is a continuation of International Patent Application No. PCT/EP2020/085799, filed Dec. 11, 2020, entitled METHOD FOR UPDATING A CONTROL PROGRAM OF AN AUTMATION SYSTEM WITH DATA MIGRATION OF A PROGRAM STATE OF THE CONTROL PROGRAM, which claims priority to German patent application DE 10 2019 134 373.9, filed Dec. 13, 2019, entitled VERFAHREN ZUM AKTUALISIEREN EINES STEUERPROGRAMMS EINES AUTOMATISIERUNGSSYSTEMS MIT DATENMIGRATION EINES PROGRAMMZUSTANDS DES STEUERPROGRAMMS, each of which is incorporated by reference herein, in the entirety and for all purposes.

FIELD

The present application provides a method for updating a control program of an automation system with simultaneous migration of data describing a program state of the control program.

BACKGROUND

In automation technology, subscribers of an automation system are usually controlled and read out by a controller of the automation system by cyclically executing a corresponding control program. For each cycle in which the respective subscribers are controlled according to the respective control instructions of the control program, information describing the state of the automation system and the control program is recorded and stored by the controller. A so-accessed global state comprises the complete information necessary to reflect the state of the automation system and the control program. For example, a global state may comprise the variables, functions, databases, or other objects used in the control program. Furthermore, the global state may comprise information with regard to the subscribers of the automation system or with regard to processes running in the automation system.

Such a global state may be recreated after the completion of each control cycle so that the current state of the automation system and the control program may be reflected at any time. The global state is the content of a corresponding global memory area. During the execution of a cycle of the control program, the memory may be changed (several times, if necessary). With each change of the memory, the state may thus change. Invalid intermediate states may occur. Towards the end of the cycle, the global state is consistent and is maintained until the start of the next execution cycle.

When the control program is executed again in a subsequent control cycle, the control program may retrieve the data stored in the global state and thus continue to control the automation system in the subsequent cycle based on the state of the automation system in the previous control cycle.

During operation of an automation system, situations often arise in which various parameters have to be readjusted or processes have to be changed or adjusted in order to achieve or guarantee an optimized operation of the automation system. In this context, it is often necessary during operation to replace a control program that is currently running with a more up-to-date version in which the necessary adjustments are taken into account. In order to be able to avoid a restart of the automation system after the replacement and instead continue to operate the automation system in the current state, the current version of the control program must be able to access the information of the global state, which describes the state of the control program and the automation system at the time of the last executed control cycle. This is the only way to ensure that the execution of the current version of the control program may continue to control the automation system based on the current state of the automation system and that a complete restart of the automation system may be avoided.

A problem occurs if changes in the current version of the control program affect the information stored in the global state. For example, variables may be renamed, removed or added in the current version of the control program, or data types of objects of the control program may have changed. Such changes or modifications may prevent the current version of the control program from directly accessing the information of the global state, since a mapping between the variables or objects of the updated control program and the objects stored in the global state may be disturbed.

In other words, the executable code of the control program may assume a certain structure of the global state, e.g. at which relative position of the corresponding memory a variable is located and how the contents of the memory there are to be interpreted.

It is therefore necessary to adapt the information of the global state to the current version of the control program and the changes made in it, so that if the adjustment is successful, the current control program may access the information of the global state and control the automation system in its current state.

SUMMARY

An improved method for updating a control program of an automation system with simultaneous transfer of a current program state is provided.

A method for updating a control program of an automation system with data migration of a program state of the control program is provided, wherein a controller of the automation system comprises a first control program and a second control program, wherein the first control program is executed cyclically to control the automation system, wherein the second control program is an update of the first control program, and wherein the first control program comprises a first data element of a first data type that describes a program state of the first control program and stored in a first memory area of the controller. The second control program comprises a second data element of a second data type that describes a program state of the second control program and is stored in a second memory area.

The method comprises generating a first migration function for mapping the first data element to the second data element in a first generating step, interrupting cyclic execution of the first control program in an interrupting step; determining a value of the first data element in a first determining step, wherein the determined value of the first data element describes a program state of the control program at the time of the interruption, and mapping the value of the first data element to the second data element by executing the first migration function in a migrating step.

This achieves the technical advantage that an improved method for updating a control program of an automation system may be provided, which simultaneously allows for data migration of a program state of the control program. The method allows for a control program used for cyclic control of an automation system to be replaced by an updated version of the control program during operation of the automation system.

BRIEF DESCRIPTION OF THE DRAWINGS

The present invention is described in more detail with reference to the accompanying figures, which show.

DETAILED DESCRIPTION

Figure 1:
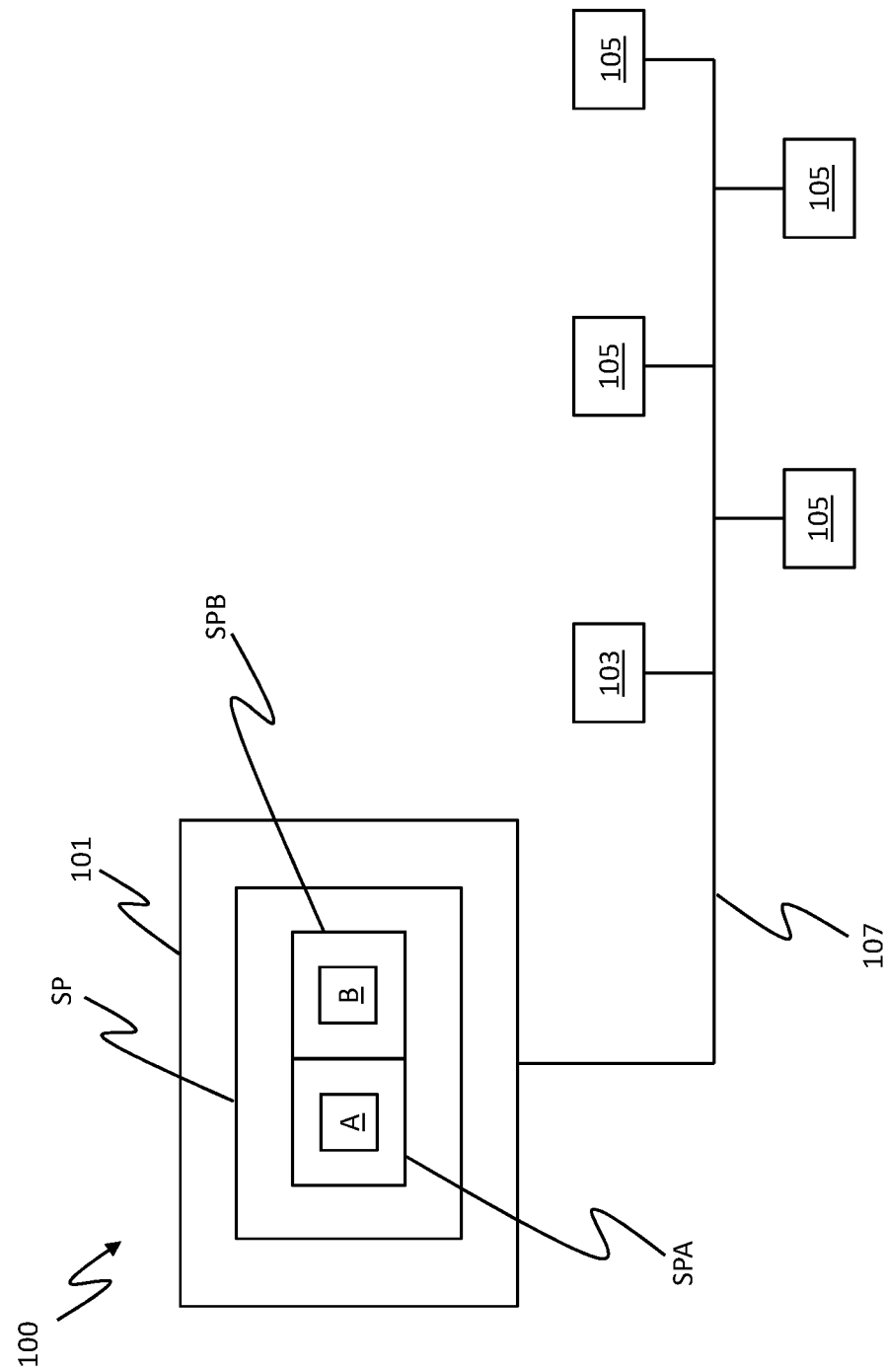
FIG. 1 is a schematic depiction of an automation system according to an example.

For these purposes, a first control program, which is cyclically accessed and executed at the time of execution of the method for controlling the automation system, and a second control program, which may be an updated version of the first control program and is intended to replace the first control program, are stored in a memory of the controller of the automation system. The first control program further comprises a first data element stored in a first memory area of the memory and describing a state of the automation system and the first control program.

The second control program may be an updated version of the first control program and may include changes to the first control program in the form of an update. Alternatively, the second control program may be an older version of the first control program that differs from the current version of the first control program. Alternatively, the second control program may be an independently programmed control program that does not need to be based on the first control program.

The first data element may be constructed as a complex data structure and include a plurality of objects and describe a global state of the first control program and the of automation system.

In the following, objects are data objects or objects of a control program and may also have a complex data structure and comprise a complex information content. The global state is formed by the objects comprised by the first data element and includes all information required for controlling the automation system.

A second memory area stores a second control program, which may be an updated version of and serve as a replacement for the first control program. The second control program includes a second data element in which information regarding the global state of the second control program may be stored. The second data element may in turn have a complex data structure and comprise a plurality of objects defined in the second control program. The information comprised by the objects or by the second data element describes a global state of the second control program.

In order to replace the first control program by the second control program and to transfer the global state of the first control program to the second control program, a first migration function is generated in a first generating step. The first migration function serves to map the first data element to the second data element and thus to transfer the information relating to the global state of the first control program the nomenclature of the second control program, or to express the information of the global state of the first control program in the objects of the second control program stored in the second data element in such a way that the interpretation or meaning of the second state corresponds to the first state as far as possible.

In an interrupting step, the cyclic execution of the first control program is interrupted, and in a first determining step, a value of the first data element is subsequently determined. When the cyclic execution of the first control program is interrupted, the information regarding the global state of the first control program and of the automation system at the time of interruption of the cyclic execution of the first control program is stored in the first data element. The value of the first data element thus describes the global state of the automation system at the time of interruption of the cyclic execution, or at the time of or after completion of the last executed control cycle.

Interrupting the cyclic execution of the first control program may be performed during a control cycle, between two control cycles, before a control cycle is started, or after a control cycle is completed.

In a migrating step, the value of the first data element is then mapped to the second data element by executing the first migration function. The first migration function reads out the value of the first data element and writes the read-out value to the second data element. The first migration function thus maps the value of the first data element to a value of the second control program and writes the read-out value to the second data element.

By mapping the value of the first data element, which describes the global state of the first control program and of the automation system at the time of the last executed control cycle, to the second data element, the global state of the first control program may be migrated to the second control program. If, in a subsequent step, the automation system is controlled by executing the second control program, the second control program may access the information of the global state of the automation system at the time of the last executed control cycle, which is mapped to the second data element by the migrating step, and the automation system may be controlled seamlessly in the state of the last executed control cycle based on the second control program.

By transferring the global state to the second control program, the control of the automation system based on the second control program may be continued in the last determined state and a restart of the automation system, in which the information of the global state of the first control program is lost and each process of the automation system has to be restarted and the control starts with the start state, may be avoided.

Thus, a smooth transition between the control based on the first control program and the control based on the second control program of the automation system may be achieved without a substantial standstill of the automation system. Preferably, a replacement of the first control program by the second control program may be carried out during an interruption between two successive control cycles, so that a standstill of the automation system may be completely avoided.

By mapping the global state of the first control program A and of the automation system at the time of the last control cycle executed on the basis of the first control program to the second data element in the second memory area after data migration, the global state is stored in the second data element without unusable memory gaps. The second data element forms a contiguous area in the second memory area in which all objects of the second data element are densely packed and arranged without non-usable memory gaps. By mapping the global state of the first control program and of the automation system at the time of the last control cycle executed on the basis of the first control program A to the corresponding objects of the second data element object by object in the migrating step, the global state is stored as a contiguous unit in the second memory area after successful data migration. Since the global state is completely rebuilt by the data migration in a new memory area instead of appending objects of the first data element on the one hand and discontinuing the use of object within the first data element on the other hand, fragmentation of the memory area may be prevented.

A first data element and a second data element may in the following have a complex data structure, each comprising a plurality of components or objects, which in turn may be complex data types. The first data element describes a global state of the first control program and of the automation system and thus comprises the information required to describe the respective state of the automation system or of the first control program. The second data element is arranged to describe a global state of the second control program and the automation system. At the time of carrying out the method, the second data element may already comprise all objects defined in the second control program.

A global state may comprise all variables or differently configured objects that a control program requires to access the automation system. In the global state, the respective objects of the control program may comprise corresponding values or measured values generated by operating the automation system and describing the respective state of the automation system.

In the following, a data migration is a transfer of data from a first memory area to a second memory area. In addition to reading out the data in the first memory area and writing the data to the second memory area, a data migration may comprise a conversion of the respective data type. Thus, in the course of data migration, data of a first data type in the first memory area may be converted to data of a second data type and stored in the second memory area.

Examples

According to an example, the method further comprises: verifying whether the value of the first data element may be mapped sufficiently accurately to the second data element in a first verifying step, wherein the value of the first data element may be mapped sufficiently accurately to the second data element if the value of the first data element may be represented in the second data element, if the value of the first data element may be mapped to the second data element, cyclically accessing the second control program, taking into account the second data element and controlling the automation system on the basis of the second control program in a first controlling step, and if the value of the first data element cannot be mapped to the second data element, continuing the cyclic accessing of the first control program, taking into account the first data element and controlling the automation system on the basis of the first control program in a second controlling step.

This achieves the technical advantage that a method for updating a control program with simultaneous data migration of a program state of the control program may be provided, in which the data migration of the program state may be aborted if it cannot lead to a satisfactory result, and in which, after data migration has been aborted, control of the automation system may be continued on the basis of the original control program and the associated program state.

In a verifying step, it is verified whether the value of the first data element may be mapped sufficiently accurately to the second data element. A sufficiently accurate mapping of the first data element to the second data element may be inhibited if the data type of the first data element and the data type of the second data element cannot be converted into each other without substantially changing the information content of the value of the first data element by the conversion.

The verification in the verifying step may be varied depending on the data type of the first data element and the second data element. For example, if the first data element and the second data element are of a scalar data type, an explicit verification is carried out. If the first data element and the second data element are of a composite type or a field type, the verification is performed indirectly by verifying whether the components of the composite types or the elements of the field types may be mapped to each other with sufficient accuracy, provided that they are of scalar data types. If they cannot be mapped to each other with sufficient accuracy, the first data element and the second data element cannot be mapped to each other with sufficient accuracy either. If the components of the compound types or the elements of the field types are again compound types or field types, their components or elements are used for the verification. The verification continues in this way until components of composite types or elements of field types have scalar data types.

In the following, data elements are considered not to be mappable to each other with sufficient accuracy if the information content of the original data element is changed by the mapping. Alternatively, data elements may also be regarded as not being able to be mapped to each other with sufficient accuracy if the information content of the original data element is changed so gravely by the mapping that the changed information content is unusable for further consideration. This may have to be decided on a case-by-case basis.

In the following, a data element with a data type of a compound type and a data element with a data type of a field type are not considered to be mappable to each other with sufficient accuracy. Furthermore, a data element with a data type of a compound type and a data element with a data type of a scalar type are not considered to be mappable to each other with sufficient accuracy. Furthermore, a data element of a data type of a field type and a data element of a data type of a scalar type are considered not to be mappable to each other with sufficient accuracy. Moreover, two data elements of the data type of a scalar type may also not be mapped to each other with sufficient accuracy.

In addition to cases in which the first data element cannot be mapped sufficiently accurately to the second data element due to different types of data types, a sufficiently accurate mapping may also fail if the data type of the second data element is not suitable for fully expressing the value of the first data element despite data types that are in principle compatible. For example, if the data type of the first data element is an unsigned 16-bit integer and the data type of the second data element is an unsigned 8-bit integer, and if a value of e.g. 1000 is stored in the first data element, this value of 1000 cannot be fully represented by the unsigned 8-bit integer of the second data element, the maximum numerical value of which is 255. In addition to the data types of the first data element and of the second data element and the respective compatibility of the two data types, the value of the first data element is additionally checked for representability by the data type of the second data element in the first verifying step. If the actual value of the first data element cannot be represented completely or with a required accuracy in the data type of the second data element, the first data element and the second data element are not considered to be able to be mapped to each other with sufficient accuracy.

If it is recognized in the verifying step that the value of the first data element may be mapped sufficiently accurately to the second data element, the second control program is accessed cyclically in a first controlling step to control the automation system, taking into account the second data element to which the value of the first data element has been mapped in the migrating step. The first control program is thus successfully replaced by the second control program and, due to the successful data migration of the first data element, which describes the program state or the global state of the first control program and, associated with this, of the automation system, the automation system may continue to be operated in the current state on the basis of the second control program after the first control program has been replaced by the second control program.

As a result of the successful data migration and the sufficiently accurate mapping of the value of the first data element to the second data element, the second control program may access the information stored in the second data element regarding the global state of the first control program and control the automation system based on this state. A restart of the automation system after updating the control program may thus be avoided, since the information regarding the global state of the automation system could be transferred to the nomenclature of the second control program by successful data migration and thus the second control program may access the information of the global state of the automation system.

If, on the other hand, it is determined in the verifying step that the value of the first data element cannot be mapped sufficiently accurately to the second data element, the cyclic accessing the first control program is continued in a second controlling step, taking the first data element into account. If the data migration of the global state fails and the value of the first data element cannot be mapped sufficiently accurately to the second data element, the update of the first control program is discarded and the automation system is controlled on the basis of the unchanged first control program taking into account the original global state. In this way, it may be avoided that the operation of the automation system has to be interrupted due to an incorrect data migration of the global state or an incorrect mapping of the value of the first data element to the second data element.

As the first control program and the first data element are stored in a first memory area and the second control program and the second data element are stored in a second memory area, both the first control program and the first data element remain unaffected by the data migration and the mapping of the value of the first data element to the second data element and continue to be available after both successful and faulty data migration. This provides that in case of a failed data migration of the global state or of a faulty mapping of the value of the first data element to the second data element, the original first control program and the global state of the first control program and the automation system stored in the first data element may be reverted to at any time, and thus a control of the automation system may be continued. A standstill of the automation system or a restart of the automation system may thus be avoided. A renewed update of the first control program by data migration of the global state of the first control program may be performed again at a later point in time.

According to an example, the value of the first data element is further not sufficiently accurately mappable to the second data element if a mapping of the value of the first data element to the second data element in the migrating step exceeds a predetermined time period.

This achieves the technical advantage that a longer standstill of the automation system may be avoided. If the migrating step exceeds a predetermined time period, the second controlling step continues the cyclic access of the first control program taking into account the first data element for controlling the automation system. If the data migration of the global state stored in the first data element cannot be successfully performed within a predetermined time window, the update of the first control program by the second control program and the associated data migration of the global state of the first control program are discarded and the control of the automation system is continued on the basis of the first control program and the global state stored in the first data element. Continuous operation of the automation system may thus be ensured.

According to an example, the method further comprises:
verifying whether the first migration function could be generated in the first generating step in a second verifying step, and
if the first migration function could not be generated in the first generating step, continuing the cyclic accessing of the first control program taking into account the first data element and controlling the automation system on the basis of the first control program in a second controlling step.

This achieves the technical advantage that in the event of incorrect or incomplete data migration of the global state stored in the first data element, control of the automation system may be continued on the basis of the first control program and the global state stored in the first data element. If the verifying step shows that a first migration function for mapping the first data element to the second data element could not be generated, control of the automation system based on the first control program taking into account the first data element is continued in the second controlling step.

Generating the first migration function in the first generating step may fail, in particular if the first data element cannot be mapped to the second data element with sufficient accuracy because the first data element and the second data element each have different data types that cannot be mapped to each other with sufficient accuracy without causing a substantial modification of the information content encompassed by the first data element.

If the first data element and the second data element thus have two data types that cannot be mapped to each other with sufficient accuracy due to the nature of the respective data types, the data migration is aborted after the second verifying step and control of the automation system is continued in the second controlling step on the basis of the first control program and the first data element. This in turn avoids the need of suspending operation of the automation system due to a failed data migration of the global state of the automation system stored in the first data element.

According to an example, the first migration function is configured to read out data of the first data type in the first memory area, to convert read-out data of the first data type to the second data type, and to store data converted to the second data type in the second memory area, wherein the migrating step comprises: reading out the value of the first data element at a location of the first data element in the first memory area using the first migration function in a first reading step, converting the value of the first data element to the second data type by the first migration function in a first converting step, and writing the value of the first data element converted to the second data type to a location of the second data element in the second memory area using the first migration function in a first writing step.

This achieves the technical advantage that reliable mapping of the first data element to the second data element may be ensured in the migrating step. The first migration function is embodied to map data of the first data type of the first data element to data of the second data type of the second data element. For this purpose, the first migration function is set up to read out the value of the first data element at a location in the first memory area where the first data element is stored, to convert the read-out value of the first data element into the second data type of the second data element if necessary, and to write the converted value to a location in the second memory area where the second data element is stored. If the first data element and the second data element are of the same data type, conversion of the read-out value of the first data element is omitted, and the first migration function stores the read-out value directly at the corresponding location in the second memory area. If the data types of the first and second data elements are the same, the value of the first data element may be copied to the location of the second data element in the second memory area block by block. This may speed up the migration process. In particular, block-wise copying is advantageous for field and/or compound types with a large memory space requirement.

The first migration function is characterized in that it may map any data from the first data type of the first data element to permissible data from the second data type of the second data element, provided that the datum of the first data type may be sufficiently represented in the second data type. Thus, the first migration function is not limited to mapping the first data element to the second data element, but may be used for any different data elements of the first data type and data elements of the second data type. In case that a plurality of data elements of the first data type are to be mapped to a plurality of data elements of the second data type, the first migration function may be reused for each mapping of a data element of the first data type to a data element of the second data type.

The first migration function need not always be surjective. For example, if a type of a variable is changed from an 8-bit integer to a 16-bit integer, a data migration may not produce a datum even though this is a valid value of the second type.

However, the first migration function will always return a value of the image area, i.e. a valid value of the target type. For n-bit integer types, any sequence of n bits is a valid integer, but for floating-point types invalid bit sequences that are not assigned to a floating-point number may be provided. The same may be true for subrange types, that is, integer types with an intentionally restricted range of values.

The definition range of the migration function may be restricted if the target type cannot represent all values of the source type with sufficient accuracy. Thus, the migration function may either not be applicable to all data of the first data type. Alternatively, the migration function may be applicable to all data of the source type, but may refuse to map data to each other during runtime.

This has the advantage that only a first migration function has to be generated in the first generating step. This means that even in the event that a plurality of first data elements are to be mapped to a plurality of second data elements, the process may be substantially accelerated in that only the first migration function set up for such a mapping needs to be accessed and executed again in each case for the mappings of the individual first data elements to the respective second data elements.

In particular, program memory may be saved to accommodate the migration functions. As a result, generation, translation and loading time may be reduced. Furthermore, due to cache effects, the smaller code size on typical processors may have a favorable effect on the migration time.

Thus, generating a plurality of first migration functions for mapping the plurality of first and second data elements may be omitted.

According to an example, the first generating step further comprises: identifying the data type of the first data element as the first data type and identifying the data type of the second data element as the second data type in a first identifying step, wherein the first migration function is generated based on the identified first data type and the identified second data type.

This achieves the technical advantage that a first migration function may be generated that is individually adapted to the first and second data types of the first and second data elements. By identifying the first data type of the first data element and the second data type of the second data element in the first generating step, the first migration function may be set up to map data of the first data type to data of the second data type.

Furthermore, the identification of the first and second data types of the first and second data elements in the first identifying step may ensure that in the second verifying step it may be verified whether the first migration function for mapping data of the first data type to data of the second data type may be generated. During identification of the first data type and the second data type, it may be analyzed whether the first data type may be mapped to the second data type with sufficient accuracy or whether the first data type may be converted to the second data type with sufficient accuracy.

Furthermore, it is achieved that for any data element of any first data type and any second data element of any second data type, a corresponding first migration function from data of the first data type to data of the second data type may be generated by identifying for each first data element and each second data element the corresponding first data type and second data type in the first identifying step. The first migration function generated in such a way is not limited to the first and second data elements, but is generally applicable to data or data elements of the first and second data types. This limits the number of required migration functions and the generated migration functions can be reused.

According to an example, the first generating step further comprises: if the first data type of the first data element and the second data type of the second data element are each a composite type, and if the first data element comprises at least a first data sub-element of a third data type and the second data element comprises at least a second data sub-element of a fourth data type, identifying the data type of the first data sub-element as the third data sub-type and the data type of the second data sub-element as the fourth data type in a second identifying step, generating a second migration function for mapping the first data sub-element to the second data sub-element on the basis of the identified third data type and the identified fourth data type in a second generating step, wherein the second migration function is arranged to read out data elements of the third data type in the first memory area, to convert read-out data of the third data type into the fourth data type, and to store data converted into the fourth data type in the second memory area.

This achieves the technical advantage that for first and second data elements, each of which are of a composite type, sufficiently accurate data migration of a global state stored in the first data element is possible.

In practice, the first data element and the second data element, which respectively describe the global state of the first control program and the second control program, will usually be of the data type of a compound type and comprise a plurality of objects or subordinate data elements or data sub-elements. The individual data sub-elements of the respective first and second data elements may be individual variables, complex data objects or other objects of the corresponding first and second control programs.

If the first data element and the second data element are each of a composite type and the first data element has at least one first data sub-element and the second data element has at least one second data sub-element, a second identifying step identifies the data type of the first data sub-element and the data type of the second data sub-element.

After identifying the data types of the first data sub-element and the second data sub-element, a second migration function is generated in a second generating step for mapping the first data sub-element to the second data sub-element. The second migration function is set up to map any data of the data type of the first data sub-element to any data of the data type of the second data sub-element. For this purpose, the second migration function is set up to read out corresponding data elements of the data type of the first data sub-element in the first memory area, to convert read-out data into the data type of the second data sub-element, and to store the converted data in the second memory area. In the case in which the first data element and the second data sub-element are of the same data type, the conversion is omitted, and the second migration function reads out the data of the data type of the first data sub-element in the first memory area and stores it in the second memory area. If the data types of the first and second data sub-elements are the same, the value of the first data sub-element may be copied to the location of the second data sub-element in the second memory area block by block. This may speed up the migration process.

In analogy to the first migration function, the second migration function is also not limited to a mapping of the first data sub-element to the second data sub-element, either. Rather, the second migration function is set up to map any data elements of the third data type to any data elements of the fourth data type. This has the advantage that when a plurality of first data sub-elements, each of the same data type, are mapped to a plurality of second data sub-elements, which also have the same data type among themselves, merely a second migration function needs to be generated. Mapping of the plurality of first data sub-elements to the plurality of second data sub-elements may then be achieved by repeatedly accessing and applying the second migration function to first data sub-elements and second data sub-elements.

This in turn may accelerate the migration of the global state in terms of time by only having to generate a small number of first and second migration functions by which a plurality of first and second data elements or first and second data sub-elements may be mapped to one another. In particular, a saving of migration code may be saved, e.g. if in the case of two pairs of first and second data sub-elements the two first data elements have the same data type and the two second data elements each have the same data type. In this case, only a second migration function needs to be generated for data migration of the two pairs. Moreover, program memory to hold the migration functions may be saved. As a result, generation, translation and loading time may be reduced. Furthermore, due to cache effects, the smaller code size on typical processors may have a favorable effect on migration time.

According to an example, the first generating step further comprises:
  identifying, in a third identifying step, a first relation between the first data sub-element and the second data sub-element that allows for an allocation between the first data sub-element and the second data sub-element.

This provides the technical advantage of precise and fast migration. The identified relation may be used for mapping the first data sub-element to the second data sub-element, in that the relation states which first data sub-element is to be mapped to which second data sub-element. In addition, a relation between data sub-elements and location information of the data sub-elements in the memory area may be used to determine at which relative location in the second memory area the second data sub-element is located.

In a third identifying step, a first relation between the first data sub-element and the second data sub-element is further determined. The first relation allows for a sufficiently precise allocation between the first data sub-element and the second data sub-element and exists at least if the first data sub-element and the second data sub-element are named identically.

The identified relations between first data sub-elements and second data sub-elements allow for a mapping between the respective elements, which may be used to determine which first data sub-elements have to be mapped to which second data sub-elements for data migration of the global state. In order to be able to ensure during data migration that the information content of the global state in the first data element is retained unchanged in the mapping to the second data element, first data elements are mapped exclusively to second data elements for which a relation exists between the first data elements and the second data elements. The identified relations between first data elements and second data elements ensure that the respective related first data elements and second data elements have the same function and meaning according to the first control program and second control program. Only data sub-elements that are associated with one another via a relation are mapped to one another. In this way, sufficiently accurate data migration may be achieved.

In a mathematical sense, for a pair of data elements, each of which is of the composite type, a two-digit relation may be provided that puts the components of one data element in relation to the components of the other data element.

Both data elements may have components that are not related to a component of the other data element. A component of the one data element may stand only have a relation with one component of the in each case other data element at most. Formally the relation may thus be a partial function, which allocates the components of the one data element to the components of the respective other data element.

According to an example, the migrating step comprises: accessing the second migration function by the first migration function; and executing the second migration function to map a value of the first data sub-element to the second data sub-element in a first partial migrating step, wherein the first partial migrating step comprises: reading out a value of the first data sub-element at a location of the first data sub-element in the first memory area by the second migration function in a second reading step, converting the value of the first data sub-element into the fourth data type using the second migration function in a second converting step, and writing the value of the first data sub-element converted into the fourth data type to a location of the second data sub-element in the second memory area using the second migration function in a second writing step.

This provides the technical advantage of achieving sufficiently accurate migration of global state by mapping first data sub-elements of the first data element sufficiently accurately to corresponding second data sub-elements of the second data element.

For this purpose, in a partial migrating step, the first migration function accesses the second migration function for mapping a value of the first data sub-element to the second data sub-element. After the first migration function has been accessed to map the first data element to the second data element and it has been identified that the first data element comprises at least one first data sub-element and the second data element comprises at least one second data sub-element related to the first data sub-element, the second migration function is accessed and executed to map the first data sub-element to the second data sub-element using the first migration function.

For this purpose, a memory address of the first data sub-element and a memory address of the second data sub-element may first be determined. This may be carried out using the first migration function. When the second migration function is accessed, the memory address of the first data sub-element and the memory address of the second data sub-element may be passed on from the first migration function to the second migration function.

To map the first data sub-element to the second data sub-element, the second migration function reads a value of the first data sub-element from the first memory area, converts the value to the data type of the second data sub-element if necessary, and writes the read-out and possibly converted value to a location of the second data sub-element in the second memory area. If the first data sub-element and the second data sub-element each have identical data types, the conversion of the read-out value is omitted and the second migration function writes the read-out value of the first data sub-element directly to the location of the second data sub-element in the second memory area.

If the first data element comprises a plurality of first data sub-elements and the second data element comprises a plurality of second data sub-elements, wherein the first data sub-elements are each of an identical third data type and the second data sub-elements are each of an identical fourth data type, wherein a plurality of pairs of first data sub-elements and second data sub-elements are provided between which there is a relation, the first migration function accesses the second migration function several times to map each of the pairs of first data sub-elements and second data sub-elements to one another.

If the first data element comprises a plurality of first data sub-elements of different data types and the second data element comprises a plurality of second data sub-elements of different data types, a second migration function is generated for each pair of first data sub-elements and second data sub-elements between which a relation exists. To migrate the global state and to map the first data sub-elements to the second data sub-elements related to them, the first migration function accesses and executes the relevant second migration functions one after the other, so as to map the first data sub-elements in pairs to the second data sub-elements related to them in each case.

By successively accessing and executing the second migration function via the first migration function, the global state data migration procedure may again be accelerated in time. In particular, a saving of migration code may be achieved, e.g. if in the case of two pairs of first and second data sub-elements, the two first data elements have the same data type and the two second data elements each have the same data type. In this case, only a second migration function is required to migrate data between the two pairs, but it is executed twice. In addition, program memory to hold the migration functions may be saved. As a result, generation, translation and loading time may be reduced. Furthermore, due to cache effects, the smaller code size on typical processors may have a favorable effect on migration time.

By accessing the second migration function using the first migration function in the first partial migrating step, the complexity of the global state data migration may in turn be reduced.

According to an example, the first partial migrating step comprises: If the first data type of the first data sub-element and the second data type of the second data sub-element are each a composite type, and if the third data type of the first data sub-element and the fourth data type of the second data sub-element are a same scalar type, reading out the value of the first data sub-element at the location of the first data sub-element in the first memory area using the second migration function in the second reading step, and writing the read-out value to the location of the second data sub-element in the second memory area using the second migration function in the second writing step.

This achieves the technical advantage that an acceleration of the data migration of the global state may be achieved. In the event that the first and second data elements are each a composite type and comprise at least a first data sub-element and a second data sub-element, and in the event that the first and second data sub-element are of an identical scalar type, mapping the first data sub-element to the second data sub-element is limited to reading out the value of the first data sub-element in the first memory area using the second migration function and writing the read-out value to the location of the second data sub-element in the second memory area using the second migration function.

This may achieve the technical advantage that for identical data types, in particular for identical scalar types, a mapping of first and second data sub-elements is achieved by copying the values of the first data sub-elements stored in the first memory area into the respective corresponding locations of the second memory area block by block. Thereby, a substantial acceleration of the migration process of the global state may be achieved. For the block-by-block copying of the values of the first data sub-elements in the first memory area to the corresponding locations in the second memory area, the second migration function, or the plurality of second migration functions, reads in the values of the first data sub-elements into the first memory area and writes the read-in values directly to the corresponding locations in the second memory area. Additional converting steps are not necessary.

According to an example, the first generating step further comprises: if the third data type of the first data sub-element and the fourth data type of the second data sub-element are a composite type, and if the first data sub-element comprises at least a first component of a fifth data type and the second data sub-element comprises at least a second component of a sixth data type, identifying the data type of the first component as the fifth data type and the data type of the second component as the sixth data type in a fourth identifying step, and generating a third migration function for mapping the first component to the second component based on the identified fifth data type and sixth data type in a third generating step, wherein the third migration function is configured to read out data of the fifth data type in the first memory area, to convert read-out data to the sixth data type, and to store data converted to the sixth data type in the second memory area.

This achieves the technical advantage of enabling flexible and reliable data migration of a complex global state. In the case that the first data element and the second data element are each of a composite type and the first data element comprises at least a first data sub-element and the second data element comprises at least a second data sub-element, and in the case that the first data sub-element and the second data sub-element are also each of a composite type and the first data sub-element comprises at least a first component and the second data sub-element comprises at least a second component, the data type of the first component and the data type of the second component are identified in a fourth identifying step.

On the basis of the identified data types of the first component and the second component, a third migration function for mapping the first component to the second component is generated in a third generating step. The third migration function is set up to read out any data from the fifth data type of the first component in the first memory area, to convert the read-out data to the sixth data type of the second component, and to store the converted data in the second memory area.

In analogy to the first migration function and the second migration function, the third migration function is not limited to a mapping of a first component to a second component, either. Rather, the third migration function is also set up for a general mapping of any data of the fifth data type of the first component to any data of the sixth data type of the second component. This in turn achieves the advantage that in the case that the first data sub-element comprises a plurality of first components and the second data sub-element comprises a plurality of second components, and in the case that each of the first components has the same data type and each of the second components has an identical data type, only a third migration function needs to be generated for mapping the plurality of first components to the plurality of second components, which is embodied to map data of the fifth data type of the first component to data of the sixth data type of the second component. This in turn has the advantage that the migration process of the global state is simplified and may therefore be carried out in a shorter time.

In particular, program memory may be saved to accommodate the migration functions. As a result, generation, translation and loading time may be reduced. Furthermore, due to cache effects, the smaller code size on typical processors may have a favorable effect on the migration time.

By generating the third migration function on the basis of the identified data types of the first component and of the second component, it is ensured that the third migration function is set up to map data of the data type of the first component to data of the data type of the second component.

First and second components are in the following data elements or data objects and may have a complex data structure.

According to an example, the first generating step comprises:
    identifying, in a fifth identifying step, a second relation between the first component and the second component that provides a sufficiently accurate mapping between the first component and the second component.

This has the technical advantage that precise migration is possible. The identified relation may be used for mapping the first component to the second component, in that the relation states which first component is to be mapped to which second component. Furthermore, a relation between components and location information of the components in the memory area may be used to determine at which relative location in the second memory area the second component is located.

By identifying the relation between the first component and the second component, it may in turn be ensured that a value of the first component is mapped exclusively to a second component of the second data sub-element that is related to the first component. A relation between a first component and a second component is given here if both components are named identically in each case. An existing relation between a first component of the first data sub-element and a second component of the second data sub-element means that the first component of the first data sub-element in the first control program has the same meaning and function or role as the second component of the second data sub-element in the second control program, which is related to the first component.

If the first data sub-element comprises a plurality of first components and the second data sub-element comprises a plurality of second components, identifying relations between the first components and the second components may be used to determine which of the first components are to be mapped to which of the second components by applying the third migration function. Alternatively, the first components and the second components may be associated with each other via a single relation. First components for which no relation to one of the second components may be identified are not mapped to second components of the second data sub-element by a third migration function. The same applies to second components for which no relation to one of the first components is identifiable, either. No values of first components of the first data sub-element are mapped to these second components. As in the case of the first and second data sub-elements, only first components and second components for which a relation is identifiable are mapped to each other. The information of the first components may be discarded in this case. The second components, on the other hand, may be set to an initial value.

Alternatively, the relations between the first components of the first data sub-element and the second components of the second data sub-element may be comprised by the first relation between the corresponding first data sub-element and the corresponding second data sub-element, such that the first relation between the first data sub-element and the second data sub-element also associates first components of the first data sub-element with second components of the second data sub-element.

Alternatively, a plurality of first components of the first data sub-element may be associated with a plurality of second components of the second data sub-element via a second relation.

According to an example, the migrating step comprises:
  accessing the third migration function using the second migration function, and
  executing the third migration function in a second partial migrating step,
  wherein the second partial migrating step comprises:
    reading out a value of the first component at a location of the first component in the first memory area using the third migration function in a third reading step, converting the value of the first component to the sixth data type by the third migration function in a third converting step, and
    writing the value of the first component converted to the sixth data type to a location of the second component in the second memory area using the third migration function in a third writing step.

This achieves the technical advantage that a flexible and precise migration process of the data migration of the global state may be provided. After generating the third migration function and after identifying the third data type of the first data sub-element and the fourth data type of the second data sub-element and after identifying the first components and the second components, the third migration function is accessed and executed by the second migration function in a second partial migrating step in order to map first components of the first data sub-element to second components of the second data sub-element that are related to the first components.

For this purpose, a memory address of the first components and a memory address of the second components may be determined first. This may be done by the second migration function. When the third migration function is accessed, the memory address of the first component and the memory address of the second component may be passed on from the second migration function to the third migration function.

For mapping, the third migration function reads out the value of the first component in the first memory area, converts the value to the sixth data type of the second component if necessary, and stores the converted value at a location of the second component in the second memory area. If the first component and the second component are of the same data type, there is no need to convert the read-out value into the data type of the second component and the read-out value of the first component is stored directly at the corresponding location in the second memory area. If the data types of the first and second components are identical, values of the first components may be copied to the location of the second components in the second memory area block by block. This may speed up the migration process.

In the case in which the first data sub-element comprises a plurality of first components and the second data sub-element comprises a plurality of second components, and in the case in which relations exist between a plurality of the first components and a plurality of the second components that allow sufficiently accurate mapping of first components to second components, and in the case that at least some of the related first components and second components have a different data type, a plurality of third migration functions are accessed and executed for mapping the plurality of first components to the plurality of second components, each of the plurality of migration functions being arranged to map data of a fifth data type of at least one of the first components to data of a sixth data type of at least one of the second components.

The plurality of third migration functions are each accessed and executed one after the other by the second migration function, so that in each case a first component is mapped onto a second component related to the first component in succession. In this way, a migration process of the global state of the first control program that is reduced in complexity and accelerated in time may be achieved by reducing the required migration functions to a minimum.

According to an example, the first generating step further comprises:
  if the third data type and the fourth data type are a field type, if the first data sub-element and the second data sub-element comprise an identical number of dimensions, wherein the first data sub-element in at least one dimension according to a first index range [U0, . . . , UM] comprises indexed first elements of a seventh data type and the second data sub-element comprises indexed second elements of an eighth data type in at least one dimension according to a second index range [X0, . . . , XN], and if the first index range [U0, . . . , UM] and the second index range [X0, . . . , XN] are equal,
  identifying the data type of each first element indexed according to the first index range [U0, . . . , UM] as the seventh data type, and the data type of each second element indexed according to the second index range [X0, . . . , XN] as the eighth data type, in a sixth identifying step, generating a fourth migration function for mapping first elements to second elements based on the identified seventh data type and eighth data type in a fourth generating step, wherein the fourth migration function is arranged to read out data of the seventh data type in the first memory area, to convert read-out data to the eighth data type, and to store converted data in the second memory area.

This achieves the technical advantage of providing a flexible and precise method for updating a control program with data migration of a program state. In the case that the first data sub-element and the second data sub-element are each of a field type, the field types each comprising an identical number of dimensions, and in the case that the first data sub-element has in at least one dimension according to a first index range indexed first elements of an identical seventh data type, and in the case that the second data sub-element has, in at least one dimension according to a second index range, indexed second elements of an identical eighth data type, in a sixth identifying step the seventh data type of the first elements of the first index range and the eighth data type of the second elements of the second index range are identified. Furthermore, in a third identifying step, relations between first elements and second elements are identified, wherein first elements are related to second elements if the first elements and the second elements are each indexed identically.

After identifying the seventh data type of the first elements, the eighth data type of the second elements, and the relations between the first and second elements, a fourth generating step generates a fourth migration function for mapping first elements to second elements based on the identified data types and the identified relations.

In analogy to the first migration function, the second migration function, and the third migration function, the fourth migration function is not limited to mapping the first elements to the second elements. Rather, the fourth migration function is arranged to map any data of the seventh data type to any data of the eighth data type. For this purpose, the fourth migration function is arranged to read in data of the seventh data type in the first memory area, to convert the read-in data to the eighth data type if necessary, and to store the read-out and possibly converted data in the second memory area.

Thus, to map the first data sub-element to the second data sub-element, only a fourth migration function is generated, which is embodied to map data of the seventh data type to data of the eighth data type. To map the plurality of first elements to the plurality of second elements, the corresponding fourth migration function is accessed multiple times in succession and executed on pairs of related first and second elements. A plurality of fourth migration functions, each of which is limited to mapping a first element of the first data sub-element to a second element of the second data sub-element, may thus be avoided. Hereby, the migration process of the global state of the first control program may be simplified and thus accelerated in time.

Alternatively, the first data sub-element has first elements indexed in a plurality of dimensions according to a plurality of first index ranges. Similarly, the second data sub-element has second elements indexed in a plurality of dimensions according to a plurality of second index ranges. The first index ranges may be the same and have an equal number of first elements. Similarly, the second index ranges may be the same and have an equal number of second elements. Alternatively, first index ranges may be different and have a different number of first elements. Analogously, second index ranges may be different and have a different number of second elements.

According to an example, the first generating step comprises:
  identifying, in a seventh identifying step, a third relation between a first element and a second element that provides a sufficiently accurate mapping between the first element and the second element.

This has the technical advantage that a precise migration is possible. The identified relation may be used for mapping the first element to the second element, in that the relation states which first element is to be mapped to which second element. Furthermore, a relation between elements and location information of the elements in the memory area may be used to determine at which relative location in the second memory area the second element is located.

Alternatively, the third relation between the first element of the first data sub-element and the second element of the second data sub-element may be comprised by the first relation between the corresponding first data sub-element and the corresponding second data sub-element, so that through the first relation between the first data sub-element and the second data sub-element, the first element of the first data sub-element is also associated with the second element of the second data sub-element. Alternatively, the first relation between the first data sub-element and the second data sub-element may associate a plurality of first elements with a plurality of second elements.

Alternatively, a plurality of first components of the first data sub-element may be associated with a plurality of second components of the second data sub-element via the third relation. Alternatively, pairs of first elements and second elements may be associated by a plurality of third relations.

According to an example, the first generating step further comprises:
  if the first index range [U0, . . . , UM] and the second index range [X0, . . . , XN] are not equal,
  determining an interval [R, S] in the index ranges of the first data sub-element and the second data sub-element with R=max(X0, U0) and S=min(XN, UM) in an index-determining step, wherein R is the larger of the two lower bounds X0, U0 and S is the smaller of the two upper bounds XN, UM,
  identifying the data type of each first element indexed according to the interval [R, S] as the seventh data type and the data type of each second element indexed according to an interval [R, S] as the eighth data type in a sixth identifying step, and
  generating a fourth migration function for mapping first elements to second elements based on the identified seventh data type and the eighth data type in a fourth generating step, wherein the fourth migration function is configured to read out data of the seventh data type in the first memory area, convert read-out data to the eighth data type, and store data converted to the eighth data type in the second memory area.

This achieves the technical advantage that a flexible and precise migration process of the global state of the first control program may be provided. In the event that the first index range of the first data sub-element and the second index range of the second data sub-element are not identical, i.e. the indexing of the first index range and the second index range do not completely match and differ in at least one value, an intersection range of both index ranges is determined in a sixth identifying step. For the determined intersection range, the indexings in the first index range and in the second index range are identical.

A fourth migration function is generated for the first and second elements of the intersection area to map the first elements to the second elements. Only the first elements of the intersection area are mapped to the second elements of the intersection area. First and second elements with indices outside the intersection area remain unaffected by the data migration.

According to an example, the first partial migrating step comprises: accessing the fourth migration function using the second migration function, and executing the fourth migration function to map the first elements to the second elements in a third partial migrating step, and wherein the third partial migrating step comprises: reading out a value of a first element at a location of the first element in the first memory area using the fourth migration function in a fourth reading step, converting the value of the first element to the eighth data type using the fourth migration function in a fourth converting step, and writing the value of the first element converted to the eighth data type to a location of the second element in the second memory area using the fourth migration function in a fourth writing step.

This achieves the technical advantage that a flexible and precise migration of the global state of the first control program may be provided. For first data sub-elements and second data sub-elements, which are each of one field type and have an equal number of dimensions and for which a fourth migration function was generated in the fourth generating step, the fourth migration function is accessed and executed by the second migration function in a third partial migrating step.

For this purpose, a memory address of a first element and a memory address of a second element may at first be determined. This may be done using the second migration function. When the fourth migration function is accessed, the memory address of the first element and the memory address of the second element may be passed from the second migration function to the fourth migration function.

For this purpose, the third partial migrating step comprises reading out a value of a first element at a location of the first element in the first memory area using the fourth migration function, converting the read-out value into the data type of the second elements of the second data sub-element, and writing the read-out value and possibly converted value to a location of the second element in the second memory area. In the event that the data type of the first elements and the data type of the second elements are identical, conversion by the fourth migration function is not required. If the data types of the first and second elements are identical, values of the first elements may be copied to the location of the second elements in the second memory area block by block. This may speed up the migration process. In particular, if the field types of the first and second data sub-elements are the same, the first data sub-elements may be copied block by block. For first and second elements with identical seventh and eighth data types, each element may be copied block by block. As the case may be, several adjacent elements may also be copied in one block (depending on the index relation).

The fourth migration function maps only one value of a first element to a second element at a time. In the case of a plurality of first elements and second elements, the fourth migration function traverses the first elements and second elements in succession and maps a first element to a second element in each case in succession. For this purpose, the migration function may be accessed and executed sequentially by the second migration function for each first element to be mapped.

For mapping a plurality of first elements to a plurality of second elements, only one migration function is required for this purpose in each case, which is embodied to map data of the seventh data type to data of the eighth data type, where the data may comprise values, data and data elements. In analogy to the first migration function, the second migration function, and the third migration function, the fourth migration function is not limited to mapping the first elements of the first data sub-element to the second elements of the second data sub-element, either. Also, the fourth migration function is set up to map any data of the seventh data type to data of the eighth data type. This reduces the complexity of the migration process and thus speeds up the migration process in terms of time.

According to an example, the value of the first data element is further not sufficiently accurately mappable to the second data element if a value of a first data sub-element is not sufficiently accurately mappable to a second data sub-element, and/or if a value of a first component is not sufficiently accurately mappable to a second component, and/or if a value of a first element is not sufficiently accurately mappable to a second element, and wherein the first verifying step further comprises: verifying whether a value of a first data sub-element may be mapped sufficiently accurately to a second data sub-element, verifying whether a value of a first component may be mapped sufficiently accurately to a second component, and verifying whether a value of a first element may be mapped sufficiently accurately to a second element.

This achieves the technical advantage that the migration process may be aborted if migration cannot be performed without errors. This achieves the advantage that if the global state of the first control program cannot be mapped to the second data element with sufficient accuracy or without errors, the migration of the global state of the first control program or the mapping of the first data element to the second data element may be discarded and the control of the automation system may be continued with the cyclic access to the first control program, taking into account the first data element and the global state stored therein, in the second controlling step.

If a first data sub-element cannot be mapped with sufficient accuracy to a second data sub-element because e.g. the data type of the first data sub-element and the data type of the second data sub-element are not compatible or because a value of the first data sub-element cannot be completely represented in the data type of the second data sub-element, the first data element cannot be mapped to the second data element with sufficient accuracy and thus the global state of the first control program cannot be integrated into the global state of the second control program with sufficient accuracy. In this case, the migration is aborted and the automation system continues to be controlled on the basis of the first control program and the corresponding global state.

For example, a first data sub-element may not be mappable to a second data sub-element with sufficient accuracy if first components of the first data sub-element are not mappable to second components of the second data sub-element with sufficient accuracy, or if first elements of the first data sub-element are not mappable to second elements of the second data sub-element with sufficient accuracy. In both cases, the migration of the first data element to the second data element may be aborted.

In turn, the first components may not be mappable to the second components with sufficient accuracy if the first components and second components have data types that are incompatible, or if values of the first components are not fully representable in the data type of the second components. In turn, first elements of the first data sub-element may not be mappable with sufficient accuracy to second elements of the second data sub-element if the data type of the first data elements is not compatible with the data type of the second data element. Furthermore, the first elements cannot be mapped sufficiently accurately to the second elements if values of the first elements cannot be completely represented in the data type of the second elements.

According to an example, relations are identifiable for first data sub-elements and second data sub-elements, for first components and second components, and for first elements and second elements when first data sub-elements and second data sub-elements are named the same, when first components and second components are named the same, and when first elements and second elements are indexed the same.

This achieves the technical advantage that relations are automatically generated. With the same naming, objects are automatically related to each other and sufficiently precise associations between first data sub-elements and second data sub-elements, between first components and second components, and between first elements and second elements may be identified. This ensures a precise and reliable migration process.

A first data sub-element and a second data sub-element are in relation to each other if the first data sub-element and the second data sub-element are named the same. A first component of a first data sub-element and a second component of a second data sub-element are in relation to each other when the first component and the second component are named the same. A first component of a first data sub-element and a second component of a second data sub-element are in relation to each other if the first component and the second component are indexed the same.

Alternatively, a first data sub-element and a second data sub-element may be in relation to each other if such a relation is named in the second control program or a library associated with the control program. For example, for first data sub-elements and second data sub-elements that are not named the same, it may be defined in the control program that the first data sub-element and the second data sub-element are in relation to each other. The same applies to the first components and the second components and first elements and second elements, for which relations may also be defined in the second control program if the first components and second components are not named the same or the first elements and second elements are not indexed the same.

In addition, a relation may exist between first data sub-elements and second data sub-elements, between first components and second components, and between first elements and second elements if a refactoring tool or index matching tool was used for renaming the first data sub-elements to the second data sub-elements or the first components to the second components, or matching the index ranges of the first elements to the second elements. By using such a matching tool, a relation between the corresponding first data sub-elements and second data sub-elements, the first components and second components, and the first elements and second elements may be identified.

Since in the migration process only values of first data sub-elements are mapped to second data sub-elements that are related to the first data sub-elements, or values of the first components are mapped exclusively to second components that are related to the first components, and values of first elements are mapped exclusively to second elements that are related to the first elements, the additionally identifiable relations may ensure that a value of the first data element that is as comprehensive as possible may be mapped to the second data element. Thus, it may be achieved that a value of the global state of the first control program that is as comprehensive as possible may be transferred to the global state of the second control program.

According to an example, the controller further comprises a translation module for translating or interpreting a control program, wherein the first generating step is performed by the translation module.

This has the technical advantage of providing a convenient solution for generating the migration functions. The translation module is used to translate generated source code, e.g. of the second control program, into executable code that may be executed by the controller to control the automation system. Simultaneously, the translation module is embodied to execute the first generating step, the second generating step, the third generating step, and the fourth generating step for generating the first migration function, the second migration function, the third migration function, and the fourth migration function, respectively.

Furthermore, the translation module is embodied to perform the first identifying step for identifying the first data type of the first data element and the second data type of the second data element, the second identifying step for identifying the third data type of the first data sub-element and the fourth data type of the second data sub-element, the third identifying step for identifying a first relation between the first data sub-element and the second data sub-element, the fourth identifying step for identifying the fifth data type of a first component and the sixth data type of a second component, the fifth identifying step for identifying a relation between the first component and the second component, the sixth identifying step for identifying a seventh data type of a first element and an eighth data type of a second element, and the seventh identifying step for identifying a relation between the first element and the second element.

Furthermore, the translation module is embodied to perform the second verifying step for verifying whether the first migration function could be generated in the first generating step, for verifying whether the second migration function could be generated in the second generating step, for verifying whether the third migration function could be generated in the third generating step, and for verifying whether the fourth migration function could be generated in the fourth generating step.

By the translation module embodied in such a way, which is configured to generate all migration functions, respectively to identify all data types and all relations of the data element and data sub-element as well as components and elements of the data sub-elements, a simple possibility for generating the migration functions is provided. The translation module is arranged to identify, during the compilation process of the modified or newly created source code of the updated second control program, said data types and relations of the objects and the first data sub-elements, respectively, of the first data element and the objects and the second data sub-elements, respectively, of the second data element and, at the same time, to generate the corresponding first to fourth migration functions. In the following, objects of the first data element may be given by first data sub-elements and objects of the second data element may be provided by second data sub-elements. If all these steps are performed during the compilation process, the migration of the global state of the first control program may be performed after the compilation process is completed. This further reduces the complexity of the compilation process. Synergy effects may reduce the sum of individual efforts for translation, relation determination, type determination and generation of the migration function.

According to an example, the method further comprises:
  initializing the second data element in an initializing step, the initializing comprising setting the second data element to a predetermined value,
  wherein initializing the second data element comprises initializing second data sub-elements and/or second components and/or second elements.

This achieves the technical advantage that the control of the automation system may be carried out taking into account the second data element and on the basis of the second control program. By initializing the second data element, in which all values of the second data element are set to an initial value, the second control program may take the values of the second data element directly into account for the control of the automation system. This corresponds to starting the second control program from the initial state.

Initializing the second data element here includes initializing all second data sub-elements of the second data element. Initializing all second data sub-elements here comprises initializing all second components or second elements of all second data sub-elements.

In the migrating step and in the first to third partial migrating steps, values of the first data sub-elements or the first components and first elements of the first data sub-elements are mapped exclusively to second data sub-elements or second components or second elements of the second data sub-elements for which a relation to the respective first data sub-elements or first components and first elements exists. Second data sub-elements, second components or second elements for which no relations to corresponding first data sub-elements, first components or first elements could be identified are disregarded in the data migration. These second data sub-elements, second components or second elements are set to a predetermined initial value in the initialization. This allows all objects of the second data element to be assigned a valid numerical value that either corresponds to a value of a corresponding object of the first data element or is an initial value. In this way, the second control program may be executed on the basis of the second data element.

This provides the technical advantage of simplifying data migration by setting all objects of the second data element to an initial value in one step.

Alternatively, only selected second data sub-elements and/or second components and/or second elements may be initialized in the initializing step.

Alternatively, the initializing step may be performed before the migrating step. In particular, the initializing step may already be executed while the first control program is still being executed. This may shorten the migration process and thus the time during which execution of the first control program and the second control program is interrupted and the automation system is not operated.

In this case, all second data sub-elements as well as all second components and/or all second elements may be set to initial values before the start of the data migration of the first data element to the second data element. In the case of the second data sub-elements and/or second components and/or second elements for which data migration may be carried out in accordance with the provided method, the respective initial value is subsequently overwritten in the migrating step with a value of a corresponding first data sub-element, a first component and/or a first element of the first data element.

In particular, the initialization achieves the advantage that no further computational or memory resources are consumed for a selective initialization, since already existing initialization functions may be used to construct the start state in the event of a regular start. Furthermore, the advantage is achieved that an initialization function may already be executed while the first control program is still being executed. The initialization thus does not fall within the time-critical period in which the cyclic execution of the first and second control programs is suspended.

According to an example, the first data element comprises a plurality of first data sub-elements of the third data type and the second data element comprises a plurality of second data sub-elements of the fourth data type, wherein for each first data sub-element, the third data type is a composite type, a field type, a scalar type or a pointer type, and wherein for each second data sub-element, the fourth data type is a composite type, a field type, a scalar type or a pointer type.

This provides the technical advantage of providing a flexible and widely applicable method for updating a control program with simultaneous data migration of a program state. The first data element and the second data element may each comprise a plurality of first data sub-elements and second data sub-elements. Each of the first data sub-elements and each of the second data sub-elements may each be of a composite type, a field type, a scalar type, or a pointer type. If a first data sub-element or a second data sub-element is of a composite type, the first data sub-element or the second data sub-element may each comprise a plurality of first components or second components. Each of the first components or second components may in turn be of a composite type, a field type, a scalar type, or a pointer type. If a first data sub-element or a second data sub-element is of a field type, the first elements of the first data sub-element or the second elements of the second data sub-element may each be of a scalar type or a pointer type. This achieves that the migration process of the global state of the first control program to the global state of the second control program may be performed for a variety of different data structures with different data types. Thus, a high flexibility and applicability of the method for updating a control program with data migration of a program state is achieved.

Automation Systems and Methods

FIG. 1 shows a schematic diagram of an automation system 100 according to an example.

The automation system 100 in FIG. 1 comprises a controller 101, a master subscriber 103 and four slave subscribers 105, each of which is connected to one another and to the controller 101 via a bus system 107. Alternatively, the control 101 itself may form a master subscriber. In a memory SP of the controller 101, a first control program A is stored in a first memory area SPA and a second control program B is stored in a second memory area SPB. The first control program A is used for cyclically addressing the master subscriber 103 and the slave subscribers 105. The second control program B may be an updated version of the first control program A and is used for cyclically addressing the subscribers of the automation system 100, as well. An updated version may e.g. be an update of the first control program A or a modified version of the first control program A, respectively. Alternatively, the updated version may also be a completely newly programmed control program, wherein a reference of the updated version to the original version of the first control program is advantageously provided. The second control program B is thus based on the first control program A and may deviate from the first control program A in various areas of the control program.

The automation system 100 shown in FIG. 1 serves only as an exemplary illustration of an automation system. The method is not intended to be limited to the automation system shown in FIG. 1.

Figure 2:
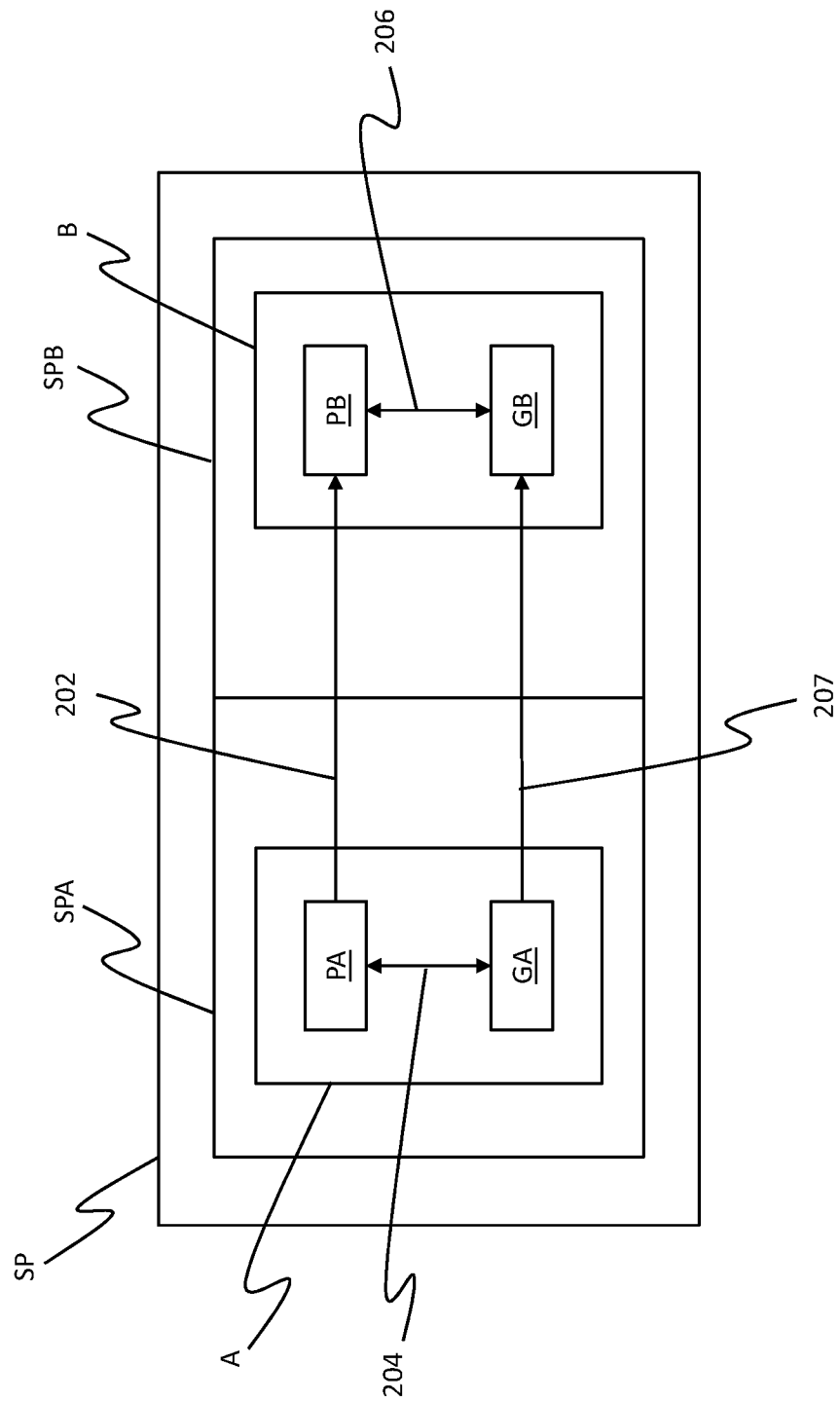
FIG. 2 is a schematic depiction of an update process of a control program of an automation system according to an example.

FIG. 2 shows a schematic depiction of an update process of a control program A of an automation system 100 according to an example.

FIG. 2 shows the memory SP of the controller 101 of the automation system 100 of FIG. 1. The memory SP is divided up into the first memory area SPA and the second memory area SPB. In the first memory area SPA, the first control program A is stored, and in the second memory area SPB, the second control program B is stored. The first control program A comprises an executable code PA and a first data element GA, and the second control program B comprises a second executable code PB and a second data element GB.

The first executable code PA of the first control program A is for executing the control program A and may be executed by the controller 101. The second executable code PB of the second control program B is for executing the second control program B and may be executed by the controller 101. The first data element GA describes a program state of the first control program A. The program state of the first control program A corresponds to the global state of the first control program A and comprises information required for executing the first control program A. The global state of the first control program A includes information required for executing the first control program A. Furthermore, the global state of the first control program A comprises all information regarding the automation program 100 and describes the state in which the automation system 100 cyclically addressed by the first control program A is located.

In a first read/writing step 204, the first executable code PA may read information from or write information to the first data element GA. The second executable code PB of the second control program B is for executing the control program B and may be executed by the controller 101 of the automation system 100. The second data element GB describes a program state of the second control program B and comprises information required for executing the second control program B.

At the time of data migration, the second control program B is not executed, and the second data element GB therefore does not comprise any information regarding the state of the automation system 100. At the time of data migration, the second data element GB contains all objects required for executing the second control program B and for controlling the automation system 100. However, the individual objects are only initiated with an initial value. The data element GB contains its initial value which corresponds to a start state. Thus, all objects of the two data element are provided with a numerical value and are thus initialized.

After successful data migration of the global state of the first control program A stored in the first data element GA to the second data element GB, the second data element comprises all information required for executing the second control program B. Furthermore, after successful data migration of the global state of the first control program A, the second data element GB comprises the information relating to the state in which the automation system 100 was at the time before the data migration was performed, in particular at the time directly after the last executed control cycle. In a second read/writing step 206, the second executable code PB of the second control program B may write data to or read data from the second data element GB. If necessary, after data migration has been performed, the information of the first data element GA may not be completely mapped to the second data element GB. The objects or second data sub-elements that cannot be assigned a value of a corresponding first data sub-element of the first data element GA retain their initial value.

For updating the first control program A by the second control program B with simultaneous data migration of the program state of the first control program A according to the method for updating a control program of an automation system with data migration of a program state of the control program, the first executable code PA of the first control program A is replaced by the second executable code PB of the second control program B in a first replacement step 202. The arrow shown in FIG. 2 between the first executable code PA and the second executable code PB implies that the first executable code PA and the second executable code PB are replaced, and that the second executable code PB is at least partially based on or derived from the first executable code PA, and have at least the commonality that both codes serve to control the same automation system 100. This is not to exclude that the second executable code PB was generated completely independently of the first executable code PA. Furthermore, a value of the first data element GA describing the program state of the first control program A, in particular the global state of the first control program A and the automation system 100, is mapped to the second data element GB in a migrating step 207.

By mapping the value of the first data element GA to the second data element GB in migrating step 207, the program state of the first control program A or the global state of the first control program A and of the automation system 100 described by the value of the first data element GA is stored in the second data element GB. After successful data migration in migrating step 207, the second data element GB thus describes the program state of the first control program A and thus the global state of the first control program A and the automation system 100. Thus, the second data element GB comprises at least part of the information of GA, the information being represented in the form required to execute the second executable code PB.

After successful replacement of the first executable code PA by the second executable code PB in the first replacement step 202 and successful data migration of the global state of the first control program A or of the automation system 100 into the second data element GB of the second control program B in the migrating step 207, the second control program B is executable by the controller 101 of the automation system 100 and may access the global state of the first control program A or of the automation system 100 at the time after the last executed control cycle so that the automation system 100 may be controlled by the second control program B in the state at the time of the last executed control cycle. The global state of the first control program A may thus be interpreted as a global state after the last execution of the first control program A, while the state generated by the data migration and represented by the second data element GB may be interpreted as another global state before the first execution of the second control program B, both states being largely synonymous with respect to the interpretation by the first executable code PA and the second executable code PB.

Figure 3:
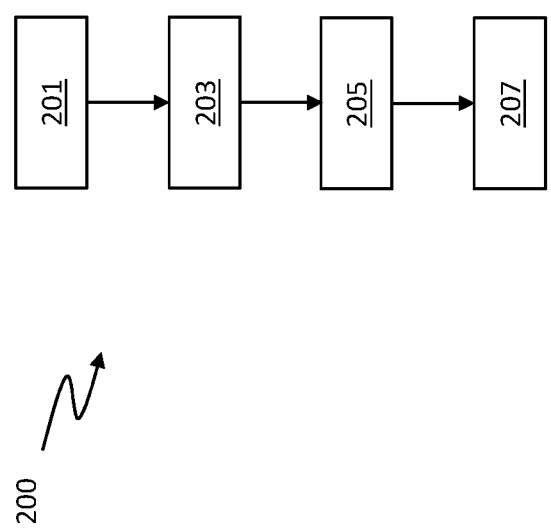
FIG. 3 is a flowchart of a method for updating a control program of an automation system with data migration according to an example.

FIG. 3 shows a flowchart of a method 200 for updating a control program A of an automation system 100 with data migration according to an example.

According to the example shown in FIG. 3, a method 200 for updating a control program of an automation system 100 with data migration of a program state of the control program relates to an automation system 100 according to FIGS. 1 and 2. Here, a controller 101 of the automation system 100 comprises a first control program A and a second control program B, wherein the first control program A is cyclically executed for controlling the automation system, wherein the second control program B is an update of the first control program A, wherein the first control program A comprises a first data element GA of a first data type which describes a program state of the first control program A and is stored in a first memory area SPA of the controller 101, and wherein the second control program B comprises a second data element GB of a second data type which describes a program state of the second control program B and is stored in a second memory area SPB.

According to the example shown in FIG. 3, the method 200 comprises the following method steps:
- generating a first migration function MIG1 for mapping the first data element GA to the second data element GB in a first generating step 201,
- interrupting the cyclic execution of the first control program A in an interrupting step 203,
- determining a value of the first data element GA in a first determining step 205, the determined value of the first data element GA describing a program state of the control program A at the time of the interruption, and
- mapping the value of the first data element GA to the second data element GB by executing the first migration function MIG1 in a migrating step 207.

The automation system 100 is accessed via the controller 101 by cyclically executing the first control program A. The first data element GA stores information relating to the first control program A that is required to execute the first control program A. This information may comprise variables, functions, or libraries or otherwise established objects that must be accessed by the first control program to control the automation system 100.

During cyclically executing the first control program A, the first control program A accesses the first data element GA and may read data from the first data element GA or write data to the first data element GA. The information in the first data element GA thus describes a program state of the first control program A, which describes the state in which the first control program A is located. The first data element GA further stores information relating to the automation system 100, which is used to define a state in which the automation system 100 is located. The information stored in the first data element GA is interpreted below as the global state of the first control program A and of the automation system 100. The global state describes the program state of the first control program A and at the same time the state of the automation system 100.

The second control program B represents an updated version of the first control program A and serves to replace the first control program A. Information describing a program state of the second control program B is stored in the second data element GB. During execution of the method 200, the second control program B is not executed, and no information regarding the state of the automation system 100 is located in the second data element GB. Alternatively, the second data element GB may be initialized with an initial value. During the execution of the method 200, and thus temporally prior to the completion of a data migration according to the migrating step 207, all variables, functions, databases, parameters, or other objects required to execute the second control program B are stored in the second data element GB. However, the objects stored in the second data element GB do not have values suitable for describing the current state of the automation system 100.

The object of the method 200 for updating a control program of an automation system with data migration of a program state of the control program is to replace the first control program A by the second control program B and to transfer the information stored in the first data element GA regarding the state of the automation system 100 to the second data element GB, so that after successful replacement of the first control program A by the second control program B, the second control program B may access the state of the automation system 100 by reading in the information in the second data element GB, so that control of the automation system 100 may be seamlessly continued after replacement of the first control program A by the second control program B.

For this purpose, a transfer of a value of the first data element GA, which comprises the information relating to the program state of the first control program A or relating to the state of the automation system 100, into the second data element GB is required.

For this purpose, a first migration function MIG1 for mapping the first data element GA to the second data element GB is generated in a first generating step 201. The first migration function MIG1 is used to transfer the information stored in the first data element GA to the second data element GB. The information stored in the first data element GA is interpreted below as the value of the first data element GA, and the information stored in the second data element GB is interpreted below as the value of the second data element GB.

After generating the first migration function MIG1 in the first generating step 201, the cyclic execution of the first control program A is interrupted in an interrupting step 203. By interrupting the cyclic execution of the first control program A, the operation of the automation system 100 is interrupted. In the first data element GA, the state of the automation system 100 after the last executed control cycle is described. By interrupting the cyclic execution of the first control program A in the interrupting step 203, it is ensured that the value of the first data element GA is not changed any further, so that a consistent transfer of the value of the first data element GA to the second data element GB is allowed for. After interrupting the cyclic access of the first control program A in the interrupting step 203, the value of the first data element GA corresponds to the program state of the first control program A at the end of the last executed control cycle. Similarly, the value of the first data element GA describes the state of the automation system 100 at the end of the last executed control cycle.

The interruption of the cyclic execution of the first control program A in the interrupting step 203 is preferably performed after completion of a previously executed control cycle, and thus after a complete execution of the control program A. Alternatively, however, the interrupting step 203 may also be performed at any time within an executed control cycle.

After interrupting the cyclic execution of the first control program A in the interrupting step 203, the value of the first data element GA is determined in a first determining step 205. As already mentioned, the value of the first data element GA describes the program state of the first control program A or the state of the automation system 100 at the time of the last executed control cycle or at the time of the interruption of the execution of the first control program A. After interruption of the cyclic execution of the first control program A in the interrupting step 203, the value of the first data element GA is no longer changed, since the first control program A is no longer executed and thus cannot read values from or write values to the first data element GA.

After determining the value of the first data element GA in the first determining step 205, the first migration function MIG1 is executed in a migrating step 207 and the value of the first data element GA is mapped to the second data element GB by transferring the value of the first data element GA to the second data element GB. In this process, values of objects contained in the second data element GB are overwritten by values of corresponding objects of the first data element GA. By mapping the value of the first data element GA to the second data element GB, the global state of the first control program A or of the automation system 100 at the time of the last executed control cycle is transferred to the second data element GB. When executing the second control program B by reading in the values stored in the second data element GB, the global state of the automation system 100 at the time of the last executed control cycle may be accessed, so that control of the automation system 100 by executing the second control program B may seamlessly follow on from the last executed control cycle.

Figure 4:
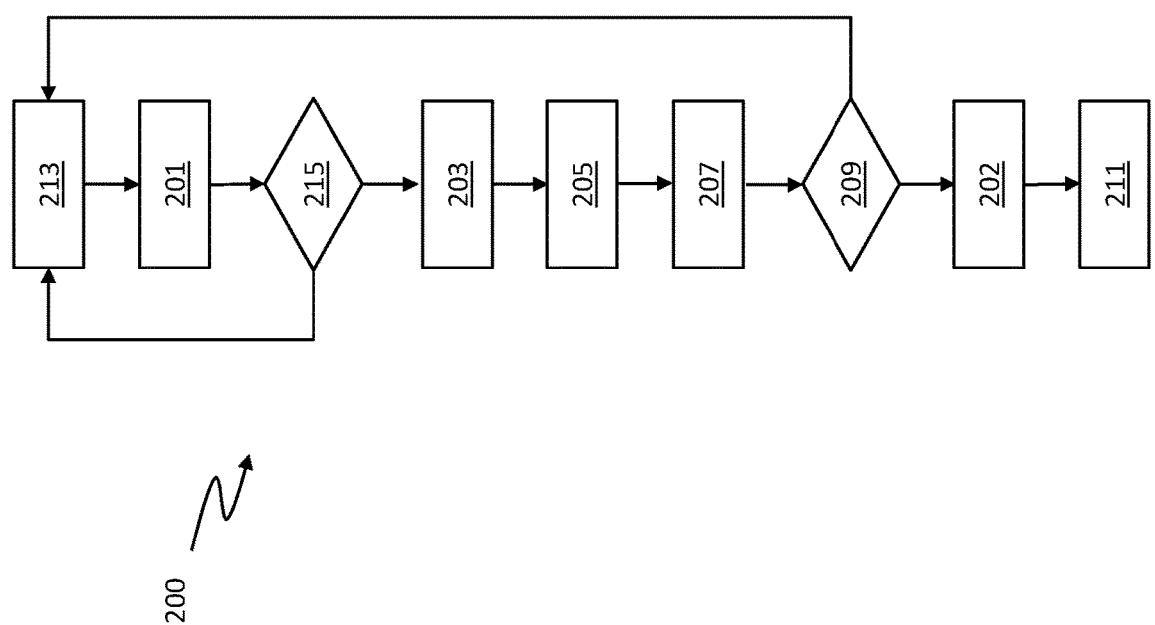
FIG. 4 is a flowchart of the method for updating a control program of an automation system with data migration according to a further example.

FIG. 4 shows a flowchart of the method 200 for updating a control program A of an automation system 100 via data migration according to another example.

The example of process 200 shown in FIG. 4 builds on the example of process 200 shown in FIG. 3 and includes all of the process steps of the example shown in FIG. 3.

In contrast to the example shown in FIG. 3, in the example of the method 200 in FIG. 4, after completion of the first generating step 201, a second verifying step 215 verifies whether the first migration function MIG1 could be generated in the first generating step 201. A generation of the first migration function MIG1 in the first generating step 201 may fail, e.g. if the first data element GA and the second data element GB have incompatible data types for which a conversion of the value of the first data element GA to the data type of the second data element GB cannot be performed with sufficient accuracy.

If the second verifying step 215 detects that a migration function MIG1 could not be generated, the cyclic access to the first control program A taking into account the first data element GA and the control of the automation system 100 based on the first control program A is continued in a second controlling step 213. If no first migration function MIG1 may be generated in the first generating step 201, the migration process is aborted, and the first control program A is not replaced by the second control program B. Instead, control of the automation system 100 continues based on the first control program A, taking into account the global state stored in the first data element GA.

On the other hand, if it is detected in the second verifying step 215 that a first migration function MIG1 could be generated in the first generating step 201, the method 200 continues with the interruption of the cyclic execution of the first control program A in the interrupting step 203.

Also deviating from the example shown in FIG. 3, in the example according to FIG. 4, after execution of the migrating step 207, a check is carried out in a first verifying step 209 as to whether in migrating step 207 the value of the first data element GA could be mapped sufficiently accurately to the second data element GB by executing the first migration function MIG1. The value of the first data element GA may in this context be mapped sufficiently accurately to the second data element GB if the value of the first data element GA may be represented in the second data type of the second data element GB. For example, the value of the first data element GA cannot be represented sufficiently accurately in the second data type of the second data element GB if the numerical value of the value of the first data element GA exceeds a maximum numerical value that may be represented in the second data type of the second data element GA.

If the first verifying step 209 determines that the value of the first data element GA could not be mapped sufficiently accurately to the second data element GB in the migrating step 207, the cyclic access of the first control program A and the control of the automation system 100 on the basis of the first control program A is continued in the second controlling step 213, taking into account the global state stored in the first data element GA. At this point, migration of the global state is terminated and control based on the first control program A is continued. By storing the first control program A and the first data element GA in the first memory area SPA and the second control program B and the second data element GB in the second memory area SPB, the first data element GA remains unaffected by the data migration. If such data migration fails for the above-mentioned, or other, reasons, the control of the automation system 100 may be continued without problems on the basis of the first control program A and of the first data element GA in the state of the last executed control cycle. The migration, on the other hand, is discarded.

On the other hand, if it is determined in the first verifying step 209 that the value of the first data element GA could be sufficiently accurately mapped to the second data element GB by executing the first migration function MIG1 in the migrating step 207, the first control program A is replaced by the second control program B in a replacement step 202.

After replacing the first control program A by the second control program B in the replacement step 202, the automation system 100 is controlled in a first controlling step 211 by cyclically accessing the second control program B taking into account the second data element GB. After successful migration in migrating step 207, the value of the second data element GB describes the global state of the first control program A and of the automation system 100 at the time of the last control cycle executed based on the first control program A. After successful migration of the value of the first data element GA to the second data element GB in migrating step 207, the automation system 100 may be controlled based on the second control program B in the state of the control cycle last executed based on the first control program A. This allows for seamless control of the automation system 100 with an updated control program.

Replacing the first control program A by the second control program B in the replacement step 202 relates to executing and controlling the automation system 100 based on the second control program B instead of on the first control program A. Replacing the first control program A with the second control program B does not preclude the first control program A from continuing to be stored in the first memory area SPA.

By mapping the global state of the first control program A and of the automation system 100 at the time of the last control cycle executed on the basis of the first control program A after data migration to the second data element GB in the second memory area SPB, the global state is stored in the second data element GB without unusable memory gaps. The second data element GB forms a contiguous area in the second memory area SPB in which all objects of the second data element GB are densely packed and arranged without unusable memory gaps. By mapping the global state of the first control program A and of the automation system 100 at the time of the last control cycle executed on the basis of the first control program A in migrating step 207 object by object to the corresponding objects of the second data element GB, the global state is stored as a contiguous unit in the second memory area SPB after successful data migration.

Figure 5:
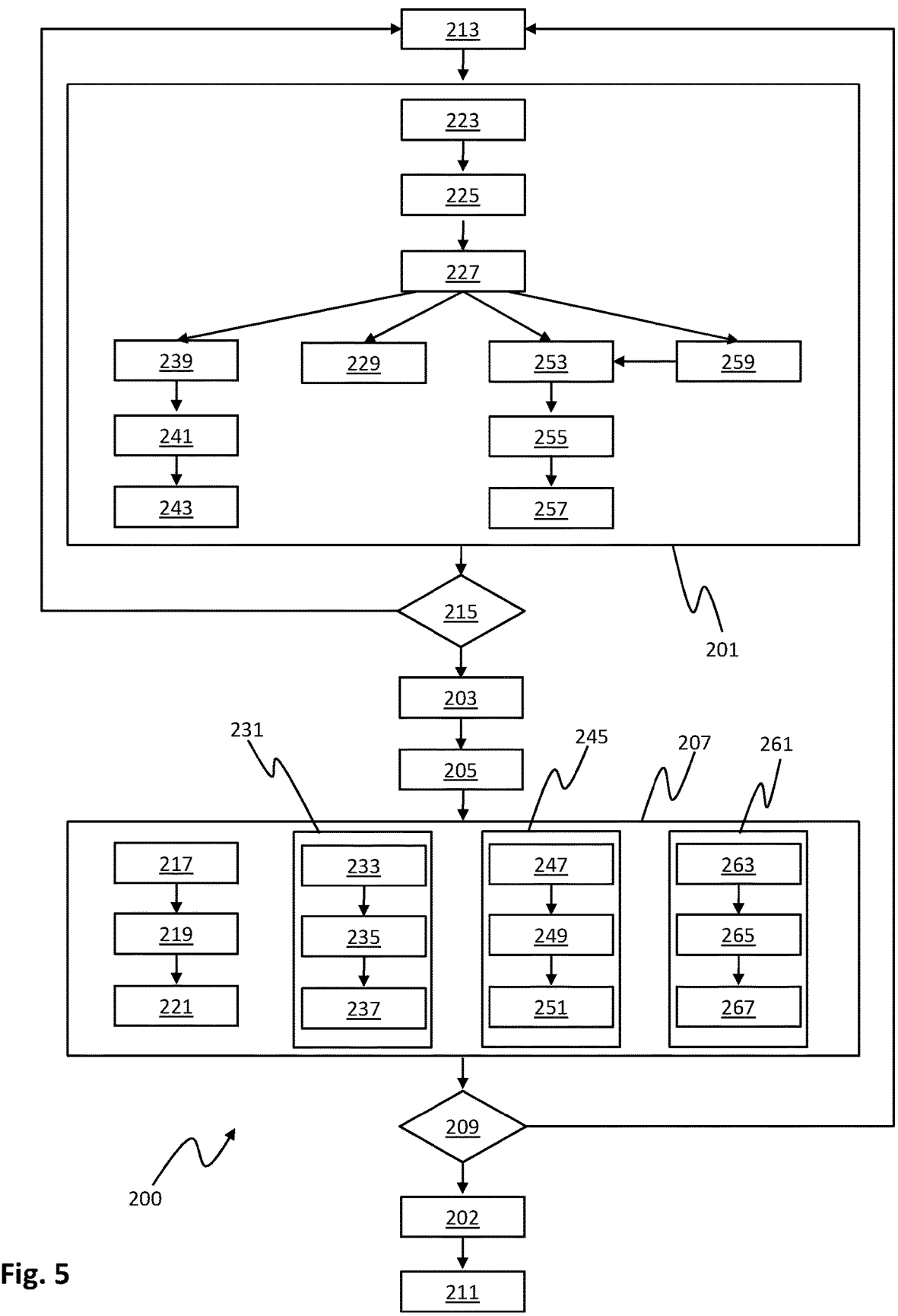
FIG. 5 is a flowchart of the method for updating a control program of an automation system with data migration according to a further example.

FIG. 5 shows a flowchart of the method 200 for updating a control program A of an automation system 100 with data migration according to a further example. The example of the method 200 shown in FIG. 5 is based on the examples shown in FIG. 3 and FIG. 4 and comprises all the method steps depicted in these figures.

In contrast to the examples shown in FIG. 3 and FIG. 4, the first generating step 201 in the example shown in FIG. 5 comprises identifying the data type of the first data element GA as a first data type and identifying the data type of the second data element GB as a second data type in a first identifying step 223. After identifying the first data type of the first data element GA and the second data type of the second data element GB, the first generating step 201 generates the first migration function MIG1 based on the identified first data type and the identified second data type.

For example, the first data type of the first data element GA and the second data type of the second data element GB may be a compound type, a field type, or another common data type. In use, the first data type of the first data element GA and the second data type of the second data element GB will typically be a composite type, and the first data element GA and the second data element GB will each comprise a plurality of objects defined below as first data sub-elements GA1 and second data sub-elements GB1.

If the first data type of the first data element GA identified in the first identifying step 223 is a compound type and the first data element GA comprises at least one data sub-element GA1, and if the identified second data type of the second data element GB is also a compound type and the second data element GB comprises at least one second data sub-element GB1, then in a second identifying step 225 the data type of the first data sub-element GA1 is identified as a third data type and the data type of the second data sub-element GB1 is identified as a fourth data type. The third data type of the first data sub-element GA1 and the fourth data type of the second data sub-element GB1 may in turn be a compound type, a field type, a scalar type, or a pointer type.

Subsequently, in a third identifying step 227, a first relation R1 is identified between the first data sub-element GA1 and the second data sub-element GB1. The first relation R1 allows for a sufficiently precise assignment between the first data sub-element GA1 and the second data sub-element GB1.

Identified relations between objects or first data sub-elements GA1 of the first data element GA and objects or second data sub-elements GB1 of the second data element GB indicate which objects or first data sub-elements GA1 of the first data element GA are to be mapped to which objects or second data sub-elements GB1 of the second data element GB in migrating step 207.

A first relation R1 exists between the first data sub-element GA1 and the second data sub-element GB1 at least if the first data sub-element GA1 and the second data sub-element GB1 are named the same. The first data sub-element GA1 and the second data sub-element GB1 respectively describe objects of the first control program A and of the second control program B. Depending on the data type of the first data sub-element GA1 and of the data sub-element GB1, these objects may describe complex objects, or represent scalar values, pointers, numerical values, character strings or unstructured values. A variable may also have a complex data type. The first relation R1 between the first data sub-element GA1 and the second data sub-element GB1 represents that the first data sub-element GA1 in the first control program A and the second data sub-element GB1 in the second control program B have an identical meaning and role. An identical meaning of objects in the first control program A and objects in the second control program B requires that, in a data migration of the value of the first data element GA to the second data element GB, the value of the object in the first data element GA must be mapped to that to the object in the second data element GB such that the interpretation of GA by PB and the interpretation of GB by PB are equivalent. Thus, the identified first relation R1 between the first data sub-element GA1 and the second data sub-element GB1 indicates that the value of the first data sub-element GA1 must be mapped to the second data sub-element GB1 during data migration of the first data element GA to the second data element GB in migrating step 207.

After identifying the third data type and the fourth data type in the second identifying step 225 and identifying the first relation R1 in the third identifying step 227, a second migration function MIG2 for mapping the first data sub-element GA1 to the second data sub-element GB1 is generated in a second generating step 229 on the basis of the identified third data type, the identified fourth data type and the identified first relation R1. The second migration function MIG2 is thereby configured to map data of the third data type to data of the fourth data type in that the second migration function MIG2 reads data of the third data type in the first memory area SPA, converts read data of the third data type to the fourth data type, and stores data converted to the fourth data type in the second memory area SPB. In the event that the third data type of the first data sub-element GA1 and the fourth data type of the second data sub-element GB1 are identical, conversion of the read-out data is omitted. In the case of identical third data type and fourth data type, the value of the first data sub-element GA1 may be copied to a location PGB1 of the second data sub-element GB1 in the second memory area SPB block by block.

In the event that the third data type of the first data sub-element GA1 and the fourth data type of the second data sub-element GB1 are a composite type, and in the case that the first data sub-element GA1 comprises at least a first component MA and the second data sub-element GB1 comprises at least a second component MB, the data type of the first component MA is identified as a fifth data type and the data type of the second component MB is identified as a sixth data type in a fourth identifying step 239. The fifth data type of the first component MA and the sixth data type of the second component MB may each be a composite type, a field type, a scalar type, or a pointer type. Furthermore, the first data sub-element GA1 may have a plurality of first components MA, each of the first components MA may have an identical fifth data type. Alternatively, a portion of the first components MA may have an identical fifth data type. Alternatively, each of the plurality of first components MA may have different data types. The second data sub-element GB1 may have a plurality of second components MB, wherein each of the second components MB may be of the sixth data type. Alternatively, each of the second components MB may have a different data type.

After identifying the fifth data type of the first component MA and the sixth data type of the second component MB in the fourth identifying step 239, a second relation R2 between the first component MA and the second component MB is identified in a fifth identifying step 241. The second relation R2 provides a sufficiently accurate mapping between the first component MA and the second component MB. The first component MA and the second component MB are associated at least via the second relation R2 if the first component MA and the second component MB are named the same. If the first data sub-element GA1 comprises a plurality of first components MA and the second data sub-element GB1 comprises a plurality of second components MB, a plurality of second relations R2 are identified between respective pairs of first components MA and second components MB. Alternatively, the plurality of first components MA and the plurality of second components MB may be associated with each other via a single second relation R2.

After identifying the fifth data type and the sixth data type in the fourth identifying step 239 and identifying the second relation R2 in the fifth identifying step 241, in a third generating step 243 a third migration function MIG3 is generated on the basis of the identified fifth data type, the identified sixth data type, wherein the third migration function MIG3 is configured to map data of the fifth data type to data of the sixth data type by the third migration function MIG3 reading data of the fifth data type in the first memory area, converting the read data to the sixth data type, and storing the converted data in the second memory area SPB. If the fifth and sixth data types are identical, the conversion of the read-out data is omitted and the value of the first component MA may be copied to the location PMB of the second component MB block by block. Alternatively, the identified second relation R2 may be used to generate the third migration function MIG3.

The generated third migration function MIG3 is not limited to mapping the first component MA to the second component MB, but is arranged to map any data of the fifth data type to any data of the sixth data type. In case that the first data sub-element GA1 has a plurality of first components MA, each of which is of the fifth data type, and the second data sub-element GB1 has a plurality of second components MB, each of which is of the sixth data type, it is sufficient to generate only a third migration function MIG3 which is configured to map data of the fifth data type to data of the sixth data type.

In order to map the plurality of first components MA to second components MB, the one third migration function MIG3 may be executed multiple times and each individual first component MA may be mapped to a second component MB. In the event that the first data sub-element GA1 comprises a plurality of first components MA each having different data types, and the second data sub-element GB1 has a plurality of second components MB each having different data types, a plurality of third migration functions MIG3 must be generated in the third generating step 243, in particular a third migration function MIG3 must be generated for each pair of data types of the plurality of first components MA and second components MB for which no migration function has been generated so far, each third migration function MIG3 being configured in each case to map data of one data type of the plurality of first components MA to data of one data type of the plurality of second components MB.

If it is recognized in the second identifying step 225 that the third data type of the first data sub-element GA1 is a field type and the fourth data type of the first data sub-element GB1 is also a field type and the first data sub-element GA1 and the second data sub-element GB1 have an identical number of dimensions, wherein for at least one dimension the first data sub-element GA1 comprises first elements which are indexed according to a first index range [U0, ..., UM] and the second data sub-element GB1 for at least one dimension comprises second elements which are indexed according to a second index range [X0, ..., XN], wherein the first index range [U0, ..., UM] and the second index range [X0, ..., XN] are equal, in a sixth identifying step 253 the data type of each first element indexed according to the first index range [U0, ..., UM] is identified as a seventh data type and the data type of each second element indexed according to the second index range [X0, ..., XN] is identified as an eighth data type. The seventh data type and the eighth data type may each be any data type, including field types, compound types, and scalars, such as numbers, pointers, or strings.

Subsequently, in a seventh identifying step 255, a third relation is identified between a first element indexed according to the first index range [U0, ..., UM] and a second element indexed according to the second index range [X0, ..., XN], respectively, which allows for a sufficiently precise allocation between the first element and the second element. A first element of the first index range [U0, ..., UM] and a second element of the second index range [X0, ..., XN] are related if the first element and the second element are indexed the same. The third relation between the first element of the first index range [U0, ..., UM] and the second element of the second index range [X0, ..., XN] implies that when the value of the first data sub-element GA1 is migrated to the second data sub-element GB1, the value of the first element must also be mapped to the second element associated with the first element via the third relation.

Subsequently, in a fourth generating step 257, a fourth migration function MIG4 is generated on the basis of the identified seventh data type, the identified eighth data type and the identified third relation, said fourth migration function MIG4 being set up to map data of the seventh data type to data of the eighth data type, in that the fourth migration function MIG4 reads out data of the seventh data type in the first memory area SPA, converts the read-out data into the eighth data type and stores the converted data in the second memory area SPB. If the seventh data type and the eighth data type are identical, conversion of the read-out data is omitted. If the seventh data type and the eighth data type are identical, the values of the first elements may be copied to the place of the second elements block by block.

If the first index range [U0, ..., UM] and the second index range [X0, ..., XN] are not identical, then in an index determining step 259 an interval [R, S] is determined in the index ranges of the first data sub-element GA1 and the second data sub-element GB1 for which R=max [X0, U0] and S=min [XN, UM]. Here, R is the larger of the two lower bounds X0 and U0 while S is the smaller of the two upper bounds XN and UM. After determining the interval [R, S], the sixth identifying step 253, the seventh identifying step 255, and the fourth generating step 257 are performed for the first elements and second elements indexed according to the interval, each of which is indexed the same. If the interval [R, S] does not contain any first elements and second elements that have identical indexes, no fourth migration function MIG4 is generated in the fourth generating step 257, and data migration of the value of the first data sub-element GA1 to the second data sub-element GB1 is not performed. Alternatively, a fourth migration function is generated but not executed, so no migration occurs in this case either.

After completing of the first generating step 201 and/or the second generating step 229 and/or the third generating step 243 and/or the fourth generating step 257, it is verified in the second verifying step 215 whether a first migration function MIG1 could be generated in the first generating step 201 and/or whether a second migration function MIG2 could be generated in the second generating step 229 and/or whether a third migration function MIG3 could be generated in the third generating step 243 and/or whether a fourth migration function MIG4 could be generated in the fourth generating step 257.

The method 200 may be executed recursively in that the first migration functions MIG1, the second migration functions MIG2, the third migration functions MIG3, and the fourth migration functions MIG4 may be executed recursively, and migration functions of one hierarchy level may each call migration functions of the next lower hierarchy level, the first migration function being the migration function of the highest hierarchy level.

The migration functions are generated based on the data types of the data elements to be migrated and are set up to map data elements of a specific data type to data elements of a specific data type.

For example, if the first data element GA and the second data element GB are each of a composite type, a first migration function MIG1 is generated that is arranged to map a data object of a composite type that has at least one data sub-element to another data object that is also of a composite type and that also has a data sub-element as components of the composite type. If the first data element GA and/or the second data element GB have a different number of components, the data type of the first data element GA and/or the second data element GB changes and a generated first migration function MIG1 has different properties.

Depending on the data types of the first data sub-element GA1 and of the second data sub-element GB1, a second migration function MIG2 is further generated for mapping the first data sub-element GA1 to the second data sub-element GB1, which is set up to map data elements of the data type of the first data sub-element GA1 to data elements of the data type of the second data sub-element GB1. If the first data sub-element GA and the second data sub-element GB each have a plurality of first data sub-elements GA1 and of second data sub-elements GB1, then if the first data sub-elements GA1 have the same data type and the second data sub-elements GB1 have the same data type, the second migration function MIG2 for mapping the data sub-elements may be executed multiple times. If the first data sub-elements GA1 have different data types and/or the second data sub-elements GB1 have different data types, several second migration functions are required to map the data sub-elements.

If the first data sub-element GA1 and the second data sub-element GB1 are each of a composite type and the first data sub-element GA1 e.g. comprises three first components MA and the second data sub-element GB1 e.g. comprises three second components MB, as well, the second migration function is set up to map a data element of a composite type with three components to a further data element of a composite type with three components. The situation is the same for a different number of components.

For mapping the three first components MA to the three second components MB, at least a third migration function MIG3 is generated, which is set up to map data elements of a data type of the first components MA to data elements of a data type of the second components MB. If the three first components MA have different data types and/or the three second components MB have different data types, at least two and at most three third migration functions MIG3 must be generated. If all three first components MA each have the same data type and all three second components MB each have the same data type, a third migration function MIG3 is sufficient, which is executed several times to map the three first components MA to the three second components MB.

In the example described above, the first migration function MIG1 is set up to map a data element of a composite type, which comprises a component that is also formed as a data element of a composite type and in turn has three components, to a data element that is also of a composite type and has a component that is in turn embodied as a data element of a composite type and in turn has three components.

To map the first data element GA to the second data element GB, the first migration function MIG1 is executed, the first migration function MIG1 being set up to map data elements of a composite type of the first data element GA to data elements of a composite type of the second data element GB.

To map the first data sub-element GA1 to the second data sub-element GB1, the first migration function MIG1 calls the second migration function MIG2, which is arranged to map data elements of the composite type of the first data sub-element GA1 to data elements of the composite type of the second data sub-element GB1.

To map the three first components MA to the three second components MB, the second migration function MIG2 in turn accesses the third migration function MIG3 or the third migration functions MIG3, respectively, which is/are embodied to map data elements of the data type of the first components MA to data elements of the data type of the second components MB.

If the first components MA and the second components MB are each of a scalar type, the recursive execution of the migration functions ends with the third migration function MIG3. After executing the third migration function(s) MIG3 and mapping the first components MA to the second components MB, the third migration function MIG3 is terminated. As a result, the second migration MIG2 has also mapped the first data sub-element GA1 to the second data sub-element GB1 and this is terminated, as well. As a result, the first migration function MIG1 has also mapped the first data element GA to the second data element GB and this is terminated, as well. The data migration is thus completed.

If the first components MA and the second components MB are not of a scalar type, but e.g. again of a composite type and likewise in turn comprise further first components and further second components, the above-described method may be continued recursively as desired. In such a case, at least a further fifth migration function is required which is embodied to map the further first components of the first components MA embodied as composite types onto the further second components of the second components MB.

This fifth migration function would be accessed and executed by the third migration function MIG3 for mapping the first components MA to the second components MB.

In this case, the fifth migration function would be set up according to the data types of the further first components and of the further second components to map data elements of a data type of the further first components to data elements of a data type of the further second components.

To map each first component MA to the respective second component MB, the third migration function MIG3 would access the correspondingly set-up fifth migration function, whereupon the latter maps at least one further first component to a further second component. In the event of a plurality of further first components with different data types and/or a plurality of further second components with different data types, a corresponding number of fifth migration functions would have to be generated, which in turn would be accessed and executed successively by the third migration function.

Depending on the nesting of the individual data elements, in which data elements are arranged as components of other data elements of a compound type, which in turn are components of another data element of a compound type, etc., a corresponding number of migration functions may be generated, which are recursively executed to map the nested data elements.

The degree of recursion that may be covered by the method 200 is not limited by the method 200. A limitation may merely result from the available computing power of a data processing unit executing the method 200.

The above example is arbitrarily extensible with respect to the degree of nesting of the data elements. Furthermore, a number of first and second data sub-elements, as well as first and second components, is arbitrarily expandable. In case of a plurality of first and second data sub-elements, a plurality of second migration functions MIG2 may need to be generated.

In case that the first and second data sub-elements or the first and second components are of a field type instead of a compound type, the procedure described above is to be performed analogously.

A nesting of data elements, each of which is of a field type, may be handled analogously by the method 200 by recursively accessing and executing corresponding migration functions.

However, the migration functions generated for this purpose have a special feature when mapping data elements of a field type compared to the migration functions for mapping data elements of a compound type.

For example, if a first data sub-element GA1 and a second data sub-element GB1 are of a field type having an equal number of dimensions in which first and second elements are arranged accordingly, a second migration function MIG2 is generated which is arranged to map data elements of a field type having the number of dimensions and the number of elements of the data type of the first elements of the first data sub-element to data elements of a field type having the number of dimensions and the number of elements of the data type of the second elements of the second data sub-element.

Furthermore, a fourth migration function is generated which is configured to map data elements of a data type of the first elements to data elements of a data type of the second elements. The fourth migration function is embodied to individually map first elements of the first data sub-element GA1 to corresponding second elements of the second data sub-element GB1 and is accessed and executed by the second migration function MIG2.

Deviating from the example described above, in the case of field types, the second migration function MIG2 is configured to access the fourth migration function in nested loops, where the number of nested loops is related to the number of dimensions of the first and second data sub-elements of the data type of a field type.

By accessing the fourth migration function via the second migration function MIG2 in nested loops, the fourth migration function is accessed for mapping a first element to a second element, maps this element and is terminated again, whereupon in the execution of the loop the fourth migration function for mapping the next first element to the next second element is accessed and executed. By executing the fourth migration function in nested loops, all first elements to be mapped may be mapped to corresponding second elements of the second data sub-element by executing the fourth migration function individually.

Analogously to the above example, the method 200 is also applicable to data elements of the data type of a field type of any nesting of data elements, in which data elements are arranged as elements of further data elements of the data type of a field type. To execute a data migration, further fifth, sixth or further migration functions may have to be generated according to the method 200, which may be executed recursively.

In this regard, the method 200 is capable of accommodating any degree of nesting of data elements. A limit for the processable nesting is rather determined by a computing power of a data processing unit executing the method 200.

The above example is for explanatory purposes only, and the method 200 is not intended to be limited to the exemplary examples set forth herein. Variations with respect to the number of data elements, data sub-elements, components, elements, with respect to the respective data types of the described data elements, data sub-elements, components, elements, and with respect to the degree of nesting of the data elements, data sub-elements, components and elements are covered by the method 200.

Generating a first migration function MIG1 may fail if the first data type of the first data element GA cannot be converted into the second data type of the second data element GB. This is e.g. the case if the first data type and the second data type are not compatible. Generating a second migration function MIG2 may fail if the third data type of the first data sub-element GA1 and the fourth data type of the second data sub-element GB1 cannot be converted into each other. Generating a third migration function may fail if the fifth data type of a first component MA cannot be converted into the sixth data type of the second component MB. Generating a fourth migration function MIG4 may fail if the seventh data type of a first element cannot be converted into the eighth data type of a second element.

Alternatively, first migration functions MIG1, second migration functions MIG2, third migration functions MIG3, or fourth migration functions MIG4 may be generated in the above cases, however, they are not executed because the respective data types cannot be converted into each other.

For example, a first data element GA cannot be converted into a second data element GB if the first data type of the first data element GA is a compound type and the second data type of the second data element GB is not a compound type.

Similarly, a third data type of the first data sub-element GA1 cannot be converted into a fourth data type of a second data element GB1 if e.g. the third data type is a compound type and the fourth data type is not a compound type. Furthermore, the third data type cannot be converted into the fourth data type if the fourth data type is a field type and the third data type is not a field type or is also a field type, but with a different number of dimensions.

Furthermore, the value of the first data sub-element GA1 of the third data type is not transferable to the second data sub-element GB1 of the fourth data type if the third data type and the fourth data type are each of the composite type, but the fourth data type of the second data sub-element GB1 does not have a second component MB that is related to a first component MA of the first data sub-element GA1.

Furthermore, the third data type cannot be converted into the fourth data type if both data types are of the field type, but the fourth data type has no second element that is related to a first element of the third data type.

Similarly, a fifth data type of a first component MA cannot be converted into a sixth data type of a second component MB if the fifth data type and/or the sixth data type are a compound type and/or a field type.

If the fifth data type of the first component MA and the sixth data type of the second component MB or the seventh data type of the first element or the eighth data type of the second element are of a scalar type, the fifth data type can be converted into the sixth data type or the seventh data type can be converted into the eighth data type if the sixth data type may represent all values of the fifth data type or the eighth data type may represent all values of the seventh data type. For example, an integer INT can be converted into a long integer LINT. A value of a signed 16-bit integer data type can always be converted into a value of a signed 64-bit integer data type without loss of information. If necessary, a Long Integer LINT may also be converted into to an Integer INT if at least part of the values of the Long Integer LINT may be represented in the Integer INT. As the case may be, a Real is also convertible to an Integer INT if at least a comparable or similar value may be expressed in the Integer INT as in the Real. Conversely, e.g. a value of a signed 64-bit integer data type can only be converted into a value of a signed 16-bit integer data type without loss of information if it may be represented by the latter.

In particular, the data types Struct, Class and Function_Block, which are defined as composite types in the IEC 61131-3 standard, may be converted into each other. For example, the value of a Struct may be converted into the value of a Function_Block.

In particular, a data element of a scalar type to be mapped may be mapped sufficiently accurately to another data element of a larger scalar type, such as a 16-bit integer may be mapped to a 64-bit integer.

Furthermore, a data element of a scalar type to be mapped may be mapped sufficiently accurately to a further data element of a smaller scalar type if the value of the data element of larger scalar type to be mapped may be represented in the smaller scalar type of the further data element. This is the case if the value of the data element to be mapped may be represented as a binary number in the bit number available in the smaller scalar type of the further data element.

In addition, a data element of a scalar type to be mapped may be mapped with sufficient accuracy to a further data element of a smaller scalar type if the value of the data element of a larger scalar type to be mapped cannot be represented in the smaller scalar type of the further data element, but the maximum value that may be represented in the smaller scalar type of the further data element reproduces the value of the data element to be mapped with sufficient accuracy. For this purpose, a limit value may be determined for the data element to be mapped before migration, which specifies starting from which size of the value of the data element to be mapped a depiction of the value by the further data element is no longer possible with sufficient accuracy. What is described here applies to all first data elements GA, second data elements GB, data sub-elements GA1, second data sub-elements GB1, first components MA, second components MB, first elements and second elements that are of a scalar type.

Furthermore, the generation of a first migration function MIG1, a second migration function MIG2, a third migration function MIG3, or a fourth migration function MIG4 may fail if no relation can be identified between the first data element GA and the second data element GB, or the first data sub-element GA1 and the second data sub-element GB1, or a first component MA and a second component MB, or between a first element and a second element. Alternatively, a third migration function MIG3 may be generated, but then not executed because no relation was identified.

If the first migration function MIG1 and/or the second migration function MIG2 and/or the third migration function MIG3 and/or the fourth migration function MIG4 could be generated, the method 200 is continued according to the interrupting step 203 and first determining step 205 and the migrating step 207 described with respect to FIG. 3 and FIG. 4.

The procedure is continued until all first data sub-elements GA1 are mapped to all second data sub-elements GB1, or all first components MA are mapped to second components MB, or all first elements are mapped to second elements which may be mapped to each other according to the respective data types. For this purpose, the first migration function MIG1 successively accesses second migration functions MIG2, which in turn, if necessary, successively accesses corresponding third migration functions MIG3 and/or fourth migration functions MIG4.

Deviating from the examples shown in FIG. 3 and FIG. 4, the migrating step 207 of the example shown in FIG. 5 comprises invoking and accessing the first migration function MIG1 on the first data element GA and the second data element GB. Executing the first migration function MIG1 on the first data element GA and the second data element GB comprises reading out the value of the first data element GA at a location PGA of the first data element GA in the first memory area SPA in a first reading step 217, converting the value to the second data type in a first converting step 219, and writing the value converted to the second data type to a location PGB of the second data element GB in the second memory area SPB in a first writing step 221.

If the first data element GA and the second data element GB are of a composite type and the first data element GA comprises at least a first data sub-element GA1 and the second data element GB comprises at least a second data sub-element GB1, the migrating step 207 further comprises a first partial migrating step 231. In the first partial migrating step 231, a second migration function MIG2 for mapping the first data sub-element GB1 to the second data sub-element GB2 is accessed by the first migration function MIG1. When accessing the second migration function MIG2, the first migration function MIG1 passes on the memory locations in which the first data sub-element GA1 is stored in the first memory area SPA and the second data sub-element GB1 is stored in the second memory area SPB.

After accessing the second migration function MIG2, the first partial migrating step 231 comprises reading a value of the first data sub-element GA1 at a location PGA1 of the first data sub-element GA1 in the first memory area SPA in a second reading step 233, converting the read-out value into a value of the fourth data type in a second converting step 235, and writing the value converted into the fourth data type to a location PGB1 of the second data sub-element GB in the second memory area SPB in a second writing step 237.

If the first data sub-element GA1 and the second data sub-element GB1 are each of a composite type and the first data sub-element GA1 comprises at least a first component MA and the second data sub-element GB1 comprises at least a second component MB, the migrating step 207 further comprises a second partial migrating step 245 in which the second migration function MIG2 accesses the third migration function MIG3 to map the first component MA to the second component MB. When accessing the third migration function MIG3, the second migration function MIG2 passes on the addresses of the first component MA in the first memory area SPA and the second component MB in the second memory area SPB.

After accessing the third migration function MIG3, the second partial migrating step 245 comprises reading out a value of the first component MA at a location PMA of the first component MA in the first memory area SPA in a third reading step 247, converting the read-out value to a value of the sixth data type of the second component MB in a third converting step 249, and writing the value of the first component MA converted to the sixth data type to a location PMB of the second component MB in the second memory area SPB in a third writing step 251.

If the first data sub-element GA1 and the second data sub-element GB1 are each of a field type with an identical number of dimensions and the first data sub-element GA1 comprises first elements indexed in at least one dimension in a first index range [U0, . . . , UM] and the second data sub-element GB1 comprises second elements indexed in at least one dimension in a second index range [X0, . . . , XN], the migrating step 207 comprises a third partial migrating step 261 in which the second migration function MIG2 accesses a fourth migration function MIG4 for mapping the first elements to the second elements. When accessing the fourth migration function MIG4, the second migration function MIG2 transfers the memory locations of a first element in the first memory area SPA and the memory location of a related second element in the second memory area SPB.

If the fourth migration function MIG4 is accessed by the second migration function MIG2, the third partial migrating step 261 includes reading a value of a first element at a location of the first element in the first memory area SPA in a fourth reading step 263, converting the read-out value to a value of the eighth data type of the second element in a fourth converting step 265, and writing the value converted to the eighth data type to a location of the second element in the second memory area SPB in a fourth writing step 267.

If the first data element GA and the second data element GB each comprises a plurality of first data sub-elements GA1 and a plurality of second data sub-elements GB1 for which first relations R1 have been identified respectively and the first data types and second data types of which may be converted into each other, and the plurality of first data sub-elements GA1 comprises different second data types and the plurality of second data sub-elements GB1 comprises a plurality of different fourth data types, the first migration function MIG1 accesses, in the first partial migrating step 231, a plurality of different second migration functions MIG2 for mapping the plurality of first data sub-elements GA1 to the plurality of second data sub-elements GB1. The plurality of second migration functions MIG2 differs respectively with respect to the plurality of third data types and the plurality of fourth data types. Each second migration function MIG2 passes through the second reading step 233, the second converting step 235, and the second writing step 237, respectively, for mapping the first data sub-elements GA1 to the second data sub-elements GB1.

If a first data sub-element GA1 comprises a plurality of first components MA, respectively, and a second data sub-element GB1 comprises a plurality of second components MB, respectively, and the plurality of first components MA comprises a plurality of different fifth data types, and the plurality of second components MB comprises a plurality of different sixth data types, in the second partial migrating step 245, the second migration function MIG2 accesses a plurality of third migration functions MIG3 for mapping the plurality of first components MA to the plurality of second components MB, each of the third migration functions MIG3 being different with respect to the respective fifth data types and sixth data types to be mapped. In the second partial migrating step 245, each third migration function MIG3 for mapping a first component MA to a second component MB executes the third reading step 247, the third converting step 249, and the third writing step 251.

If a first data sub-element GA1 comprises a plurality of first elements and a second data sub-element GB1 comprises a plurality of second elements, then, in order to map the plurality of first elements to the second elements in the third partial migrating step 261, the fourth migration function MIG4 is accessed multiple times in succession by the second migration function MIG2 to map each first element by the second element associated according to a third relation. For each mapping, the fourth migration function MIG4 executes the fourth reading step 263, the fourth converting step 265, and the fourth writing step 267 in the third partial migrating step 261. Alternatively, contiguous first index ranges may be associated with contiguous second index ranges via the third relation.

In an example, MIG2 contains nested loops (one per dimension), with MIG4 being accessed in the innermost loop. The advantage of this is that the code size from the second migration function MIG2 is linear in the number of dimensions of the field type and does not increase linearly with the size of the field type. If an access to the fourth migration function MIG4 were generated for each element of the field type without a loop or loops, the code of the second migration function MIG2 would quickly reach a problematic size for large field types and could no longer be executed or could only be executed with difficulty.

Alternatively, for mapping a plurality of first elements to a plurality of second elements, a plurality of fourth migration functions MIG4 may be generated such that for mapping the plurality of first elements to the plurality of second elements, the plurality of fourth migration functions MIG4 are successively accessed by the second migration function MIG2 such that each first element is mapped to a second element associated according to the third relation according to an individual fourth migration function MIG4. Each individual fourth migration function MIG4 passes through the fourth reading step 263, the fourth converting step 265, and the fourth writing step 267 to map the corresponding first element to the corresponding second element in the third partial migrating step 261.

After completing the migrating step 207, the method 200 according to the example in FIG. 4 continues with the first verifying step 209, the replacement step 202, and the first controlling step 211 or the second controlling step 213.

According to an example, the automation system 100 comprises a translation module 109 that is arranged to interpret a control program of the automation system 100. Furthermore, the translation module 109 is arranged to execute the first generating step 201, the first identifying step 223, the second identifying step 225, the third identifying step 227, the second generating step 229, the fourth identifying step 239, the fifth identifying step 241, the third generating step 243, the sixth identifying step 253, the seventh identifying step 255, the fourth generating step 257, and the index-determining step 259.

According to a further example, the second data element GB may be initialized prior to executing the migrating step 207. By initializing the second data element GB, the value of the second data element GB including the values of all second data sub-elements GB1 or the values of all second components MB or all second elements is set to an initial value.

When performing the migrating step 207 including the first partial migrating step 231, the second partial migrating step 245 and the third partial migrating step 261, for the second data sub-elements GB1, second components MB and/or second elements for which a first relation R1, a second relation R2 and/or a third relation to a corresponding first data sub-element GA1, a corresponding first component MA and/or a corresponding first element has been identified and for which a second migration function MIG2, a third migration function MIG3 and/or a fourth migration function MIG4 could be generated, the respective initial values are overwritten by the corresponding migrated values of the first data sub-elements GA1, first components MA and/or first elements associated via the identified relations. For the second data sub-elements GB1, second components MB and/or second elements for which no relations to any of the first data sub-elements GA1, first components MA and/or first elements could be identified, the respective initial value is retained after completion of the migrating step 207.

The objects of the second data element GB for which no correspondence could be identified in the first data element GA in the form of a first relation R1, a second relation R2 and/or a third relation are used during cyclic execution of the second control program B on the basis of the second data element GB in the first controlling step 211, taking into account the initial value associated accordingly for the respective object.

Figure 6:
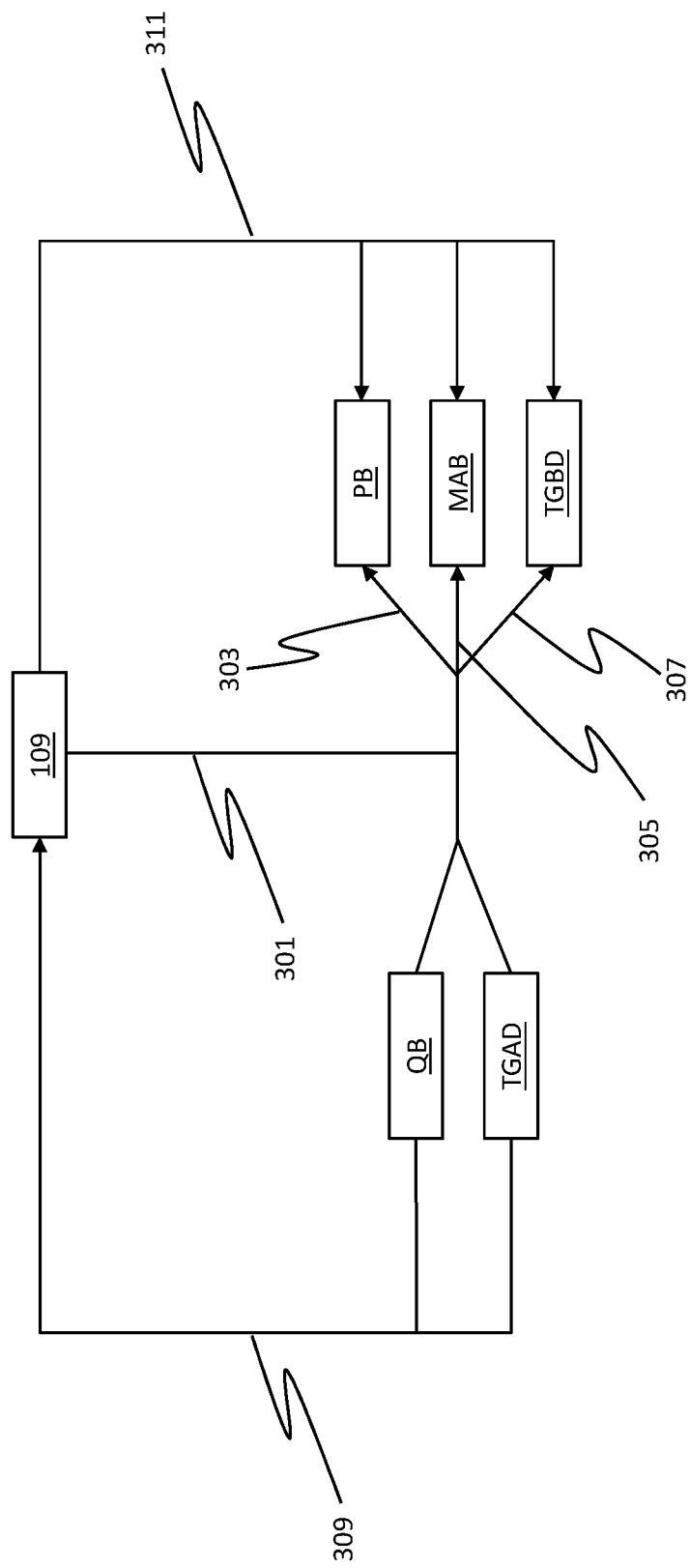
FIG. 6 is a schematic depiction of a generating process of an updated version of a control program of an automation system according to an example.

FIG. 6 shows a schematic depiction of a generating process of a second control program B as an updated version of a first control program A of an automation system 100 according to an example.

According to the example shown in FIG. 6, the translation module 109 takes a source code QB of the second control program B into account for generating the second control program B as an updated version of the first control program A. For this purpose, the translation module 109 reads in a source code QB of the second control program B in an input step 309. In a translating step 303 of the compiling process 301, the translation module 109 translates the source code QB of the second control program B into an executable code PB of the second control program B that may be executed by the controller 101 of the automation system 100 for controlling the automation system 100 based on the second control program B. The executable code PB of the second control program B outputs the translation module 109 in an output step 311.

In the compiling process 301, the translation module 109 further takes a definition of the first data type TGAD into account that the translation module reads in the input step 309. The definition of the first data type TGAD of the first data element GA defines the first data type of the first data element GA as well as all third data types of all first data sub-elements GA1, all fifth data types of all first components MA of all first data sub-elements GA1, and all seventh data types of all first elements of all first data sub-elements GA1 of the first data element GA. The definition of the first data type TGAD thus includes all first data types, all third data types, all fifth data types TMA and all seventh data types of all objects of the first data element GA.

Moreover, in the compiling process 301, the translation module 109 generates a definition of the second data type TGBD from the source text QB of the second control program B in a second generating step 307, which is output in the output step 311. In analogy to the definition of the first data type TGAD, the definition of the second data type TGBD comprises the second data type of the second data element GB as well as all fourth data types of all second data sub-elements GB1 as well as all sixth data types of all second components MB of all second data sub-elements GB1 as well as all eighth data types of all second elements of all second data sub-elements GB1 of the second data element GB. Analogous to the definition of the first data type TGAD, the definition of the second data type TGBD comprises all second data types, all fourth data types, all sixth data types and all eighth data types of all objects of the second data element GB.

Further, in the compiling step 301, the translation module 109 generates a migration code MAB in a first generating step 305, which is output in the output step 311. The migration code MAB comprises all first migration functions MIG1, all second migration functions MIG2, all third migration functions MIG3, and all fourth migration functions MIG4 generated in the first generating step 201, the second generating step 229, the third generating step 243, and the fourth generating step 257, respectively. To perform the first generating step 305 and the associated first generating step 201, second generating step 229, third generating step 243, and fourth generating step 257, the translation module 109 considers the definition of the first data type TGAD and the definition of the second data type TGBD generated in the second generating step 307.

On the basis of the definition of the first data type TGAD, in which all first data types, all third data types, all fifth data types TGMA and all seventh data types of all objects of the first data element GA are contained, and taking into account the definition of the second data type TGBD, in which all second data types, all fourth data types, all sixth data types TGMB and all eighth data types of all objects of the second data element GB are included, the first migration function MIG1 is generated by the translation module 109 in the first generating step 201, the second migration function MIG2 is generated in the second generating step 229, the third migration functions MIG3 are generated in the third generating step 243 and the fourth migration functions MIG4 are generated in the fourth generating step 257.

Alternatively, the translation module 109 may extract the information for generating the migration functions directly from the source code QB of the second control program B. In addition to all of the first migration functions MIG1, all of the second migration functions MIG2, all of the third migration functions MIG3, and all of the fourth migration functions MIG4, the migration code MAB generated by the translation module 109 in the first generating step 305 comprises execution instructions on how to access and execute the individual first migration functions MIG1, second migration functions MIG2, third migration functions MIG3, and fourth migration functions MIG4 for migrating the corresponding objects of the first data element GA to the corresponding objects of the second data element GB.

Figure 7:
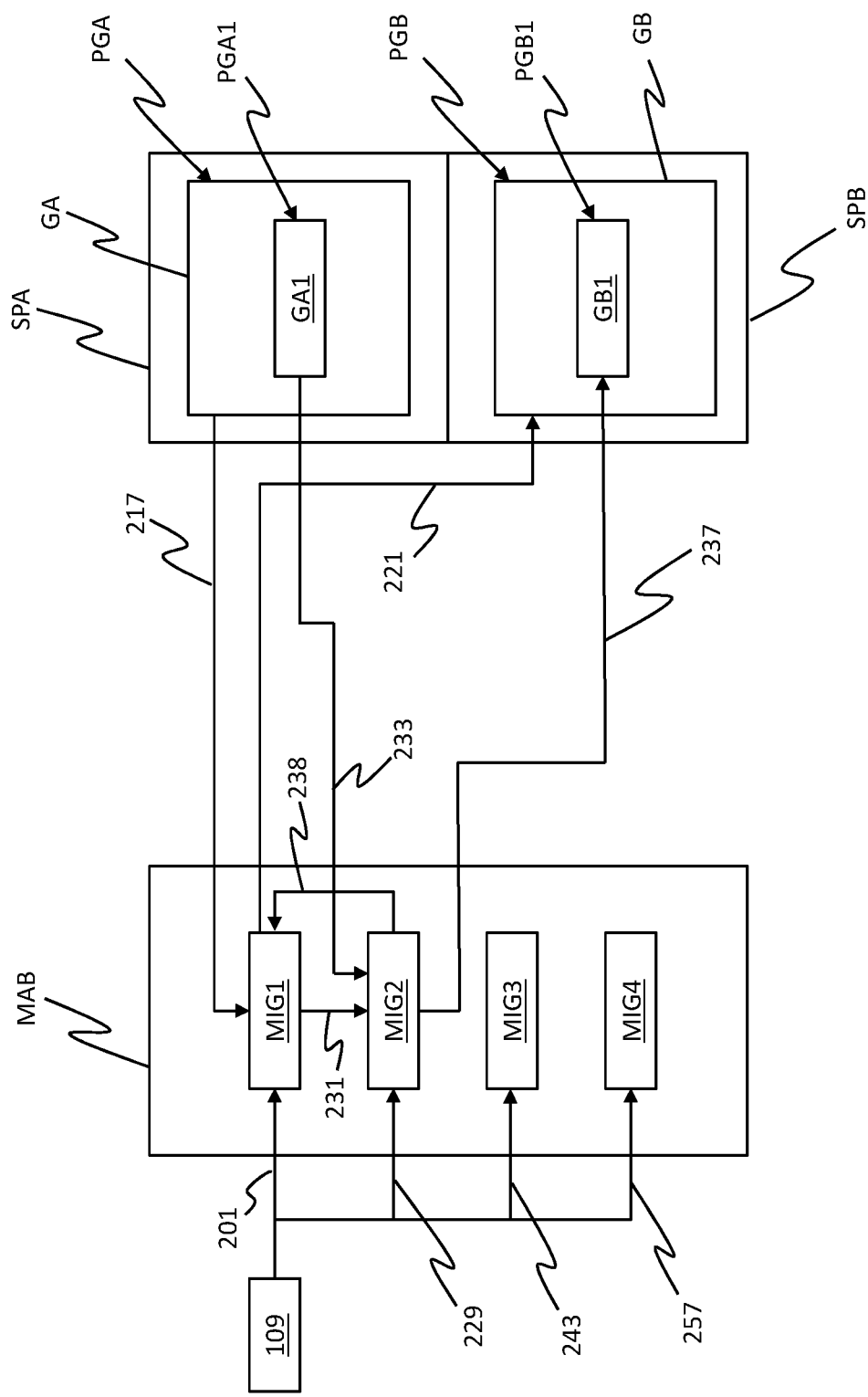
FIG. 7 is a schematic depiction of a migration process of data elements of a control program of an automation system according to an example.

FIG. 7 shows a schematic depiction of a migration process of data elements of a control program A of an automation system 100 according to an example.

FIG. 7 illustrates a migration process of a first data element GA to a second data element GB, wherein the first data element GA comprises a first data sub-element GA1 and the second data element GB comprises a second data sub-element GB1. The migration process illustrated includes generating migration functions in the generating steps described above and performing the mapping of the objects to be migrated by applying corresponding migration functions.

First, the translation module 109 generates a first migration function MIG1 in the first generating step 201, a second migration function MIG2 in the second generating step 229, a third migration function MIG3 in the third generating step 243, and a fourth migration function MIG4 in the fourth generating step 257. The migration functions are part of the migration code MAB.

The first migration function MIG1 is embodied to map the first data element GA to the second data element GB. The second migration function MIG2 is configured to map the first data sub-element GA1 to the second data sub-element GB1. The shown example is limited to mapping the first data element GA to the second data element GB and mapping the first data sub-element GA1 to the second data sub-element GB1, further first components MA, second components MB, first elements, and second elements. If the first data sub-element GA1 had no first components MA or first elements, or the second data sub-element GB1 had no second components MB or second elements, the third migration function MIG3 and the fourth migration function MIG4 would not be generated.

In order to execute the migration, the accessed first migration function MIG1 reads the value of the first data element GA in the first memory area SPA in a first reading step 217. Here, the first migration function MIG1, which is aware of the first data type of the first data element GA, identifies the first data sub-element GA1 of the first data element GA. Identification may comprise that the first migration function MIG1 derives the address of GA1 from the given address of GA. The first migration function MIG1 further knows the second data type of the second data element GB and identifies the second data sub-element GB1 of the second data element GB. Furthermore, the first migration function MIG1 knows the memory location PGA of the first data element GA and the memory location PGA1 of the first data sub-element GA1 in the first memory area SPA. Alternatively, the memory location PGA of the first data element GA and the memory location PGA1 of the first data sub-element GA1 in the first memory area SPA and/or the memory location PGB of the second data element GB and the memory location PGB1 of the second data sub-element GB1 in the second memory area SPB are transferred to the first migration function MIG1 when the first migration function MIG1 is accessed.

Alternatively, based on the memory location PGA of the first data element GA and the memory location PGB of the second data element GB, the first migration function MIG1 may derive the memory location PGA1 of the first data sub-element GA1 and the memory location PGB1 of the second data sub-element GB1. Furthermore, the first migration function MIG1 knows the memory location PGB of the second data element GB and the memory location PGB1 of the second data sub-element GB1 in the second memory area SPB.

Subsequently, the first migration function MIG1 accesses the second migration function MIG2 for mapping the first data sub-element GA1 to the second data sub-element GB1 in a first partial migrating step 231. Furthermore, the first migration function MIG1 passes the memory location PGA1 of the first data sub-element GA1 in the first memory area SPA and the memory location PGB1 of the first data sub-element GB1 in the second memory area SPB on to the second migration function MIG2.

Thereupon, in a second reading step 233, the second migration function MIG2 reads out the value of the first data sub-element GA1 at the location PGA1 of the first data sub-element GA1 in the first memory area SPA. Subsequently, in a second converting step 235, the second migration function MIG2 converts the read-out value of the first data sub-element GA1 from the third data type into a value of the fourth data type of the second data sub-element GB1.

In the following, the second migration function MIG2 writes the converted value of the first data sub-element GA1 to the memory location PGB1 of the second data sub-element GB1 in the second memory area SPB in a second writing step 237. Thus, the value of the first data sub-element GA1 is mapped to the second data sub-element GB1.

In the following, the second migration function MIG2 is terminated in a first terminating step 238 and the first migration function MIG1 continues to execute.

In the following, the first migration function MIG1 writes the value of the first data element GA to the memory location PGB of the second data element GB in the second memory area SPB in a first writing step 221. Thus, the value of the first data element GA is mapped to the second data element GB and the migration process is completed. In the present example, the first data element GA only comprises a first data sub-element GA1 and the second data element GB only comprises a second data sub-element GB1. The method 200 is not intended to be limited thereto, and both the first data element GA and the second data element GB may have a more complex data structure and each comprise a plurality of first data sub-elements GA1 and second data sub-elements GB1, which in turn may have a complex data structure and comprise, on the one hand, a plurality of first components MA and/or first elements and a plurality of second components MB and/or a plurality of second elements, respectively.

The method 200 is continued recursively in FIG. 7. Given a plurality of first data sub-elements GA1 and second data sub-elements GB1, second migration functions MIG1 are accessed multiple times in succession by the first migration function MIG1. Alternatively, a second migration function MIG2 is accessed multiple times in succession. The second migration functions then accesses the third migration functions MIG3 and/or the fourth migration functions MIG4 multiple times, as the case may be. The second migration functions MIG2 are executed until all third migration functions MIG3 and/or fourth migration functions MIG4 are completed. The first migration function MIG1 is executed until all second migration functions MIG2 have been completed.

Figure 8:
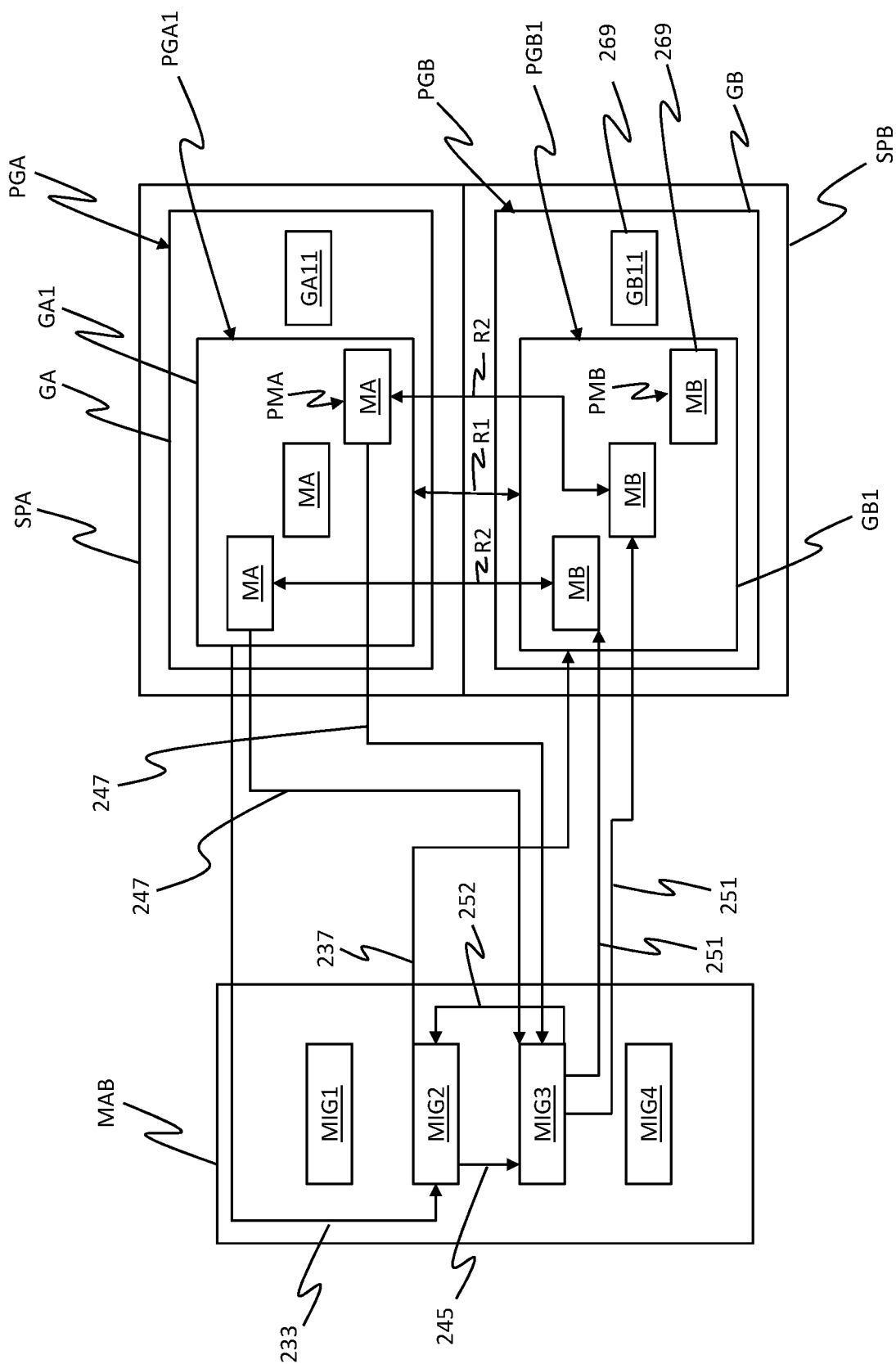
FIG. 8 is a schematic depiction of a migration process of data elements of a control program of an automation system according to a further example.

FIG. 8 shows a schematic depiction of a migration process of data elements of a control program A of an automation system 100 according to a further example.

FIG. 8 shows a further example of the migration process. Deviating from the example in FIG. 7, the first data element GA in FIG. 8 comprises a first data sub-element GA1 and a further first data sub-element GA11, of which the first data sub-element GA1 is of a composite type and comprises three first components MA. The further first data sub-element GA11 is of a different, third data type, which plays no role in the following explanation and is therefore disregarded.

The second data sub-element GB likewise comprises a second data sub-element GB1 and a further second data sub-element GB11, of which likewise the second data sub-element GB1 is of a composite type and comprises three second components MB. The further second data sub-element GB11 is in turn of a different, fourth data type, which plays no role in the further explanation and is therefore disregarded.

The first data sub-element GA1 and the second data sub-element GB1 are associated with each other via a first relation R1. The further first data sub-element GA11 is neither associated with the second data sub-element GB1 nor with the further second data sub-element GB11 via a relation. The same applies to the further second data sub-element GB11, which is also neither associated with the first data sub-element GA1 nor with the further first data sub-element GA11.

Two first components MA of the first data sub-element GA1 are associated with two second components MB of the second data sub-element GB1 via a second relation R2. A first component MA of the first data sub-element GA1 is not associated with any second component MB of the second data sub-element GB1. The same applies to a second component MB of the second data sub-element GB1, which in turn is not associated with any first component MA of the first data sub-element GA1.

In order to map the first data sub-element GA1 to the second data sub-element GB1 associated with this first data sub-element GA1 via the first relation R1, the second migration function MIG2 accesses a third migration function MIG3 for each pair of first components MA and second components MB associated via R2, wherein the memory addresses of the respective first components MA and second components MB are passed on. Previously, the second migration function MIG2 was accessed by the first migration function MIG1, as explained for FIG. 7, wherein the corresponding memory locations of the first data sub-element GA1 and the second data sub-element GB1 were transferred to the second migration function MIG2.

The second migration function MIG2 was generated with knowledge of the data types of the first components MA of the first data sub-element GA1 and the second components MB of the second data sub-element GB1 and consequently accesses, with knowledge of the data types of the first components MA of the first data sub-element GA1 and of the data types of the second components MB of the second data sub-element GB1, in a second partial migrating step 245, a corresponding third migration function MIG3 for mapping the first component MA of the first data sub-element GA1 to the first second component MB of the second data sub-element GB1. The third migration function MIG3 initially maps a first component MA to a second component MB, e.g. the left first component MA to the left second component MB, and is initially terminated thereon. If the first components MA and the second components MB are each of the same data type, the third migration function MIG2 is accessed again and maps the right first component MA to the middle second component MB. Thereupon, the third migration function MIG3 is terminated in a second terminating step 252 and the second migration function MIG2 continues to execute. If the first components MA and the second components MB are each not of the same data type, two different third migration functions are accessed to map the first components MA to the second components MB.

From the second migration function MIG2, the third migration function MIG3 receives the memory locations of the left first component MA in the first memory area SPA and the memory location of the left second components MB in the second memory area SPB. Only the left first component MA, which is related to the left two second components MB of the second data sub-element GB1 via the second relation R2, is mapped by the third migration function MIG3. Thereupon, the third migration function MIG3 is terminated and accessed again by the second migration function MIG2 to map the right first component MA to the middle second component MB. For this purpose, the third migration function MIG3 receives the memory locations of the right first component MA in the first memory area SPA and the memory location of the middle second component MB in the second memory area SPB from the second migration function MIG2. In this version of the third migration function MIG3, only the right-hand first component MA is mapped.

For mapping, in both cases, the third migration function MIG3 reads out a value of a first component MA of the first data sub-element GA1 in a third reading step 247, respectively. In a third converting step 249, the third migration function converts the read-out value of the first component MA into the sixth data type of the second component MB of the second data sub-element GB1. In a third writing step 251, the third migration function MIG3 writes the converted value to a location of the second component MB in the second memory area SPB. This maps the value of the first component MA to the second component MB.

The middle first component MA, which is not associated with a second component MB of the second data sub-element GB1 via a second relation R2, is not mapped to the second data sub-element GB1 via a third migration function MIG3. Thus, the information of the middle first component MA cannot be transferred to the second data sub-element GB.

After mapping the two first components MA to the two second components MB, the third migration function MIG3 is terminated in the second terminating step 252 and the second migration function MIG2 continues to execute. If further first components MA are to be mapped to further second components MB or further first elements are to be mapped to further second elements, the second migration function MIG2 executes this and accesses further third migration functions MIG3 and/or fourth migration functions MIG4. If no further components or elements are to be migrated, the second migration function MIG2 is terminated in the first terminating step 238. This maps the value of the first data sub-element GA1 to the second data sub-element GB1.

The further first data sub-element GA11, which is not associated with any of the two second data sub-elements GB1, GB11 via a first relation R1, is not mapped to a second data sub-element GB1, GB11 in the data migration. The information of the further first data sub-element GA11 may thus not be transferred to the second data element GB.

The further second data sub-element GB11, which is not associated with any of the first data sub-elements GA1, and the right second component MB, which is not associated with any of the first components MA, are initialized in an initializing step 269, and the value of the further second data sub-element GB11 and the value of the second component MB are set to an initial value. Alternatively, all second data sub-elements GB1, second components MB and/or second elements of the second data element GB may be initialized prior to executing the migration functions. The migration or execution of the migration functions overwrites the initial values of the second data sub-elements GB1, second components MB and/or second elements of the second data element GB with values of corresponding first data sub-elements GA1, first components MA and/or first elements of the first data element GA.

This completes the migration of the first data sub-element GA1 to the second data sub-element GB1. By applying the second migration function and the third migration function to the first data sub-element GA1, which is of composite type, it was possible to map part of the global state of the first control program A, which is represented by the value of the first data element GA, to the second data element GB. The objects of the first data element GA for which there is no correspondence in the second data element GB, in particular the represented further first data sub-element GA11 which is not associated with any second data sub-element GB1 via a first relation R1, and the represented middle first component MA which is not associated with any second component MB via a second relation R2, could not be mapped in the migration process.

After completing the migration process, the second data element GB comprises values of objects of the first element which could be mapped by applying the corresponding migration functions, and objects the values of which contain an initial value, in particular the further second data sub-element GB11 which is not associated with any first data sub-element GA1 via a first relation R1, and the right second component MB which is not associated with any first component MA via a second relation R2.

Further steps that may be required to completely migrate the global state of the first control program A and the automation system 100 represented by the value of the first data element GA at the time of the last control cycle executed on the basis of the first control program A are not described in FIG. 8. A data migration of a first data sub-element GA1 of a field type to a second data sub-element GB1 also of a field type is performed analogously to the migration process described in FIG. 8. A difference to the migration of a compound type described above results from the fact that the first elements of a data sub-element GA1 of the field type all have the same data type, which also applies to the first elements of a data sub-element GA1 of the field type, so that only a fourth migration function MIG4 is required, which is executed in a loop or in nested loops and successively individually maps first elements to second elements.

This invention has been described with respect to exemplary examples. It is understood that changes can be made and equivalents can be substituted to adapt these disclosures to different materials and situations, while remaining with the scope of the invention. The invention is thus not limited to the particular examples that are disclosed, but encompasses all the examples that fall within the scope of the claims.

TABLE 1

List of Reference Symbols 100-311

| | |
|---|---|
| 100 | Automation system |
| 101 | Controller |
| 103 | Master subscriber |
| 105 | Slave subscriber |
| 107 | Bus system |
| 109 | Compiler module |
| 200 | Method for updating a control program |
| 201 | First generating step |
| 202 | Replacement step |
| 203 | Interrupting step |
| 204 | First reading/writing step |
| 205 | First determining step |
| 206 | Second read/writing step |
| 207 | Migrating step |
| 209 | First verifying step |
| 211 | First controlling step |
| 213 | Second controlling step |
| 215 | Second verifying step |
| 217 | First reading step |
| 219 | First converting step |
| 221 | First writing step |
| 223 | First identifying step |
| 225 | Second identifying step |
| 227 | Third identifying step |
| 229 | Second generating step |
| 231 | First partial migrating step |
| 233 | Second reading step |
| 235 | Second converting step |
| 237 | Second writing step |
| 238 | First terminating step |
| 239 | Fourth identifying step |
| 241 | Fifth identifying step |
| 243 | Third generating step |

TABLE 1-continued

List of Reference Symbols 100-311

| | |
|---|---|
| 245 | Second partial migrating step |
| 247 | Third reading step |
| 249 | Third converting step |
| 251 | Third writing step |
| 252 | Second terminating step |
| 253 | Sixth identifying step |
| 255 | Seventh identifying step |
| 257 | Fourth generating step |
| 259 | Index-determining step |
| 261 | Third partial migrating step |
| 263 | Fourth reading step |
| 265 | Fourth converting step |
| 267 | Fourth writing step |
| 268 | Third return step |
| 269 | Initializing step |
| 301 | Compiling process |
| 303 | Translating step |
| 305 | First generating step |
| 307 | Second generating step |
| 309 | Input step |
| 311 | Output step |

TABLE 2

List of Control Program Symbols

| | |
|---|---|
| A First control program | B Second control program |
| Pa First executable code | QB Source text of second control program |
| MAB Migration code | SPB First memory area |
| SPS Memory | GB Second data element |
| SPA First memory area | PGB Memory location of second data element |
| GA First data element | TGBD Definition of second data type |
| PGA Memory location of first data element | GB1 Second data sub-element |
| TGAD Definition of first data type | GB11 Further second data sub-element |
| GA1 First data sub-element | PGB1 Memory location of second data sub-element |
| GA11 Further first data sub-element | MB Second component |
| PGA1 memory location of first data sub-element | PMB Memory location of second component |
| MA First component | R1 First relation |
| PMA Memory location of first location | R2 Second relation |
| | MIG1 First migration function |
| | MIG2 Second migration function |
| | MIG3 Third migration function |
| | MIG4 Fourth migration function |

The invention claimed is:

1. A method for updating a control program of an automation system with data migration of a program state of the control program,
    wherein a controller of the automation system comprises a first control program and a second control program,
    wherein the first control program is executed cyclically for controlling the automation system, wherein the second control program is an update of the first control program, wherein the first control program comprises a first data element of a first data type describing a program state of the first control program and stored in a first memory area of the controller,
    wherein the first data element comprises a plurality of first data sub-elements required for executing the first control program,
    wherein the second control program comprises a second data element of a second data type describing a program state of the second control program and stored in a second memory area, and wherein the second data element comprises a plurality of second data sub-elements required for executing the second control program; and wherein the method comprises:
generating a first migration function for mapping the first data element to the second data element in a first generating step,
interrupting cyclic execution of the first control program in an interrupting step,
determining a value of the first data element in a first determining step, wherein the value of the first data element describes the program state of the first control program at a time of the interruption, and
mapping the value of the first data element to the second data element and writing values of the first data sub-elements to the second data sub-elements initialized by an initial value by executing the first migration function in a migrating step.

2. The method according to claim 1, further comprising:
verifying whether the value of the first data element is mappable sufficiently accurately to the second data element in a first verifying step, wherein the value of the first data element is mappable sufficiently accurately to the second data element if the value of the first data element is representable in the second data type,
if the value of the first data element is mappable to the second data element, cyclically accessing the second control program taking into account the second data element and controlling the automation system based on the second control program in a first controlling step, and
if the value of the first data element cannot be mapped to the second data element, continuing cyclic accessing of the first control program taking into account the first data element and controlling the automation system on the basis of the first control program in a second controlling step.

3. The method according to claim 1, wherein the value of the first data element is further not sufficiently accurately mappable to the second data element if mapping the value of the first data element to the second data element in the migrating step exceeds a predetermined time period.

4. The method according to claim 1, further comprising:
verifying whether the first migration function could be generated in the first generating step in a second verifying step, and
if the first migration function could not be generated in the first generating step, continuing cyclic accessing of the first control program taking into account the first data element and controlling the automation system based on the first control program in a second controlling step.

5. The method according to claim 1, wherein:
the first migration function is configured to read out data of the first data type in the first memory area, to convert said read-out data of the first data type into data of the second data type, and to store said data converted into the second data type in the second memory area; and wherein the migrating step comprises:
reading out the value of the first data element at a memory location of the first data element in the first memory area using the first migration function in a first reading step,
converting the value of the first data element to a value of the second data type using the first migration function in a first converting step, and
writing the value of the first data element converted to the value of the second data type to a memory location of the second data element in the second memory area using the first migration function in a first writing step.

6. The method according to claim 1, wherein the first generating step further comprises:
identifying a data type of the first data element as the first data type and identifying a data type of the second data element as the second data type in a first identifying step, and
wherein the first migration function is generated based on the first data type and the second data type.

7. The method according to claim 1, wherein the first generating step further comprises:
if the first data type of the first data element and the second data type of the second data element are each a composite type of said data elements, and if the first data element comprises at least one of the first data sub-elements of a third data type and the second data element comprises at least one of the second data sub-elements of a fourth data type,
identifying the data type of the at least one first data sub-element as the third data sub-type and the data type of the at least one second data sub-element as the fourth data type in a second identifying step; and
generating a second migration function for mapping the at least one first data sub-element to the at least second data sub-element on the basis of the third data type and the fourth data type in a second generating step,
wherein the second migration function is configured to read out data elements of the third data type in the first memory area, to convert said read-out data of the third data type into data of the fourth data type, and to store said data converted into the fourth data type in the second memory area.

8. The method according to claim 7, wherein the migrating step comprises:
accessing the second migration function via the first migration function, and
executing the second migration function to map a value of the at least one first data sub-element to the at least one second data sub-element in a first partial migrating step, and
wherein the first partial migrating step comprises:
reading out the value of the at least one first data sub-element at a memory location of the at least one first data sub-element in the first memory area using the second migration function in a second reading step,
converting the value of the at least one first data sub-element to the fourth data type using the second migration function in a second converting step, and
writing the value of the at least one first data sub-element converted to the fourth data type to a memory location of the at least one second data sub-element in the second memory area using the second migration function in a second writing step.

9. The method according to claim 7, wherein the first generating step further comprises:
if the third data type of the at least one first data sub-element and the fourth data type of the at least one second data sub-element are each a composite type of said data sub-elements, and
if the at least one first data sub-element comprises at least a first component of a fifth data type and the at least one second data sub-element comprises at least a second
component of a sixth data type;
identifying a data type of the first component as the fifth
data type and a data type of the second component as
the sixth data type in a fourth identifying step, and
generating a third migration function for mapping the first
component to the second component based on the fifth
data type and the sixth data type in a third generating
step, wherein the third migration function is configured
to read out data of the fifth data type in the first memory
area, to convert said read-out data of the fifth data type
to data of the sixth data type, and to store said data
converted to the sixth data type in the second memory
area.

10. The method according to claim 9, wherein the migrating step comprises:
accessing the third migration function via the second
migration function and executing the third migration
function in a second partial migrating step, and
wherein the second partial migrating step comprises:
reading out a value of the first component at a memory
location of the first component in the first memory
area using the third migration function in a third
reading step,
converting the value of the first component to the sixth
data type using the third migration function in a third
converting step, and
writing the value of the first component converted to
the sixth data type to a memory location of the
second component in the second memory area using
the third migration function in a third writing step.

11. The method according to claim 7, wherein the first generating step further comprises:
if the third data type and the fourth data type are a field
type, and
if the at least one first data sub-element and the at least one
second data sub-element comprise an identical number
of dimensions, wherein the at least one first data
sub-element in at least one dimension comprises first
elements of a seventh data type indexed according to a
first index range [U0, ..., UM] and the at least one
second data sub-element in at least one dimension
comprises second elements of an eighth data type
indexed according to a second index range [X0, ...,
XN], and
if for the at least one dimension the first index range
[U0, ..., UM] and the second index range [X0, ...,
XN] are equal;
identifying a data type of each first element indexed
according to the first index range [U0, ..., UM] as
the seventh data type and a data type of each second
element indexed according to the second index range
[X0, ..., XN] as the eighth data type in a sixth
identifying step, and
generating a fourth migration function for mapping the
first elements to the second elements based on the
seventh data type and the eighth data type in a fourth
generating step, wherein the fourth migration function is configured to read out data of the seventh data
type in the first memory area, to convert said read-out data of the seventh data type to data of the eighth
data type, and to store said data converted to the
eighth data type in the second memory area.

12. The method according to claim 11, wherein the first generating step further comprises:
if the first index range [U0, ..., UM] and the second
index range [X0, ..., XN] are not equal, determining
an interval [R, S] in said index ranges corresponding to
the at least one first data sub-element and the at least
one second data sub-element with R=max(X0, U0) and
S=min(XN, UM) in an index-determining step,
wherein R corresponds to a maximum of two values of
X0 and U0 and S corresponds to a minimum of two
values of XN and UM,
identifying the data type of each first element indexed
according to the interval [R, S] or the first index
range [U0, ..., UM] as the seventh data type and the
data type of each second element indexed according
to an interval [R, S] or the second index range
[X0, ..., XN] as the eighth data type in the sixth
identifying step; and
generating the fourth migration function for mapping the
first elements to the second elements based on the
seventh data type and the eighth data type in the fourth
generating step, wherein the fourth migration function
is configured to read out the data of the seventh data
type in the first memory area, to convert said read-out
data of the seventh data type to the data of the eighth
data type, and to store said data converted to the eighth
data type in the second memory area.

13. The method according to claim 11, wherein a first partial migrating step comprises:
accessing the fourth migration function via the second
migration function, and executing the fourth migration
function to map the first elements to the second elements in a third partial migrating step, and
wherein the third partial migrating step comprises:
reading out a value of a first element of the first
elements at a memory location of the first element in
the first memory area by the fourth migration function in a fourth reading step,
converting the value of the first element to the eighth
data type via the fourth migration function in a fourth
converting step, and
writing the value of the first element converted to the
eighth data type to a memory location of a second
element of the second elements in the second
memory area via the fourth migration function in a
fourth writing step.

14. The method according to claim 2, wherein
the value of the first data element is further not sufficiently
accurately mappable to a value of the second data type
if a value of a first data sub-element of the first data
sub-elements is not sufficiently accurately mappable to
a second data sub-element of the second data sub-elements, and/or if a value of a first component is not
sufficiently accurately mappable to a second component, and/or if a value of a first element is not sufficiently accurately mappable to a second element, and
wherein the first verifying step further comprises:
verifying whether the value of the first data sub-element
is mappable sufficiently accurately to the second data
sub-element,
verifying whether the value of the first component is
mappable sufficiently accurately to the second component, and
verifying that the value of the first element is mappable to
the second element with sufficient accuracy.

15. The method according to claim 1, wherein the controller further comprises a translation module for translating
the control program, and wherein the first generating step is
performed by the translation module.

16. The method according to claim 1, further comprising initializing the second data element in an initializing step, wherein the initializing comprises setting a value of the second data element to a predefined initial value.

* * * * *

UNITED STATES PATENT AND TRADEMARK OFFICE
CERTIFICATE OF CORRECTION

PATENT NO. : 12,332,610 B2
APPLICATION NO. : 17/749205
DATED : June 17, 2025
INVENTOR(S) : Ralf Dreesen Page 1 of 1

It is certified that error appears in the above-identified patent and that said Letters Patent is hereby corrected as shown below:

In the Claims

At Column 54, Lines 28-30 (Claim 7):
"mapping the at least one first data sub-element to the at least second data sub-element"
Should be:
--mapping the at least one first data sub-element to the at least one second data sub-element--

Signed and Sealed this
Twenty-second Day of July, 2025

Coke Morgan Stewart
*Acting Director of the United States Patent and Trademark Office*